United States Patent
Terayoko et al.

(10) Patent No.: US 12,542,017 B2
(45) Date of Patent: Feb. 3, 2026

(54) AUTHENTICATION SYSTEM, OPERATION METHOD OF AUTHENTICATION SYSTEM, AND OPERATION PROGRAM OF AUTHENTICATION SYSTEM

(71) Applicant: FUJIFILM Corporation, Tokyo (JP)

(72) Inventors: Hajime Terayoko, Kanagawa (JP); Shinichiro Sonoda, Kanagawa (JP); Natsuko Yoshimura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/353,834

(22) Filed: Jul. 17, 2023

(65) Prior Publication Data

US 2023/0360453 A1    Nov. 9, 2023

Related U.S. Application Data

(63) Continuation of application No. PCT/JP2022/002189, filed on Jan. 21, 2022.

(30) Foreign Application Priority Data

Jan. 26, 2021    (JP) ................................. 2021-010293

(51) Int. Cl.
    *G07C 9/00*      (2020.01)
    *G06K 15/02*     (2006.01)
    (Continued)

(52) U.S. Cl.
    CPC ....... *G07C 9/00563* (2013.01); *G06K 15/021* (2013.01); *G06V 40/171* (2022.01);
    (Continued)

(58) Field of Classification Search
    CPC .... G07C 9/00563; G07C 9/257; G07C 9/253; G07C 9/33; G07C 9/37;
    (Continued)

(56) References Cited

U.S. PATENT DOCUMENTS 6,128,398 A * 10/2000 Kuperstein ............ G07C 9/253
                                                   382/116
6,990,588 B1 * 1/2006 Yasukura ............... G07C 9/257
                                                   713/161
(Continued)

FOREIGN PATENT DOCUMENTS

JP    2002281275    9/2002
JP    2005148537    6/2005
(Continued)

OTHER PUBLICATIONS

"International Search Report (Form PCT/ISA/210) of PCT/JP2022/002189," mailed on Apr. 12, 2022, with English translation thereof, pp. 1-5.

(Continued)

*Primary Examiner* — Adnan Aziz
(74) *Attorney, Agent, or Firm* — JCIPRNET

(57) ABSTRACT

A first processor is configured to acquire a first facial image of the user; extract first facial feature information from the first facial image; generate an authentication code representing the first facial feature information; and cause a printer to print the authentication code and a display facial image of the user on a card medium to create the ID card, and a second processor is configured to acquire the authentication code printed on the ID card possessed by the user and a second facial image of the user; decode the first facial feature information from the authentication code; extract second facial feature information from the second facial image using the same algorithm as used in a case of extracting the first facial feature information from the first facial image; collate the first facial feature information with the second facial feature information; and perform the determination based on a collation result.

11 Claims, 18 Drawing Sheets

(51) Int. Cl.
*G06V 40/16* (2022.01)
*G07C 9/25* (2020.01)

(52) U.S. Cl.
CPC ........... *G06V 40/172* (2022.01); *G07C 9/257* (2020.01); *G07C 2009/00976* (2013.01); *G07C 2209/41* (2013.01)

(58) Field of Classification Search
CPC ...... G07C 2009/00976; G07C 2209/41; G06K 15/021; G06K 15/4095; G06V 40/171; G06V 40/172; G06V 40/169; G06V 40/16; G06F 21/32
See application file for complete search history.

(56) References Cited

U.S. PATENT DOCUMENTS

| | | | | |
|---|---|---|---|---|
| 11,615,663 | B1* | 3/2023 | Chinoy | G07C 9/37 |
| | | | | 348/156 |
| 2003/0191949 | A1* | 10/2003 | Odagawa | G11B 20/00086 |
| | | | | 713/186 |
| 2004/0151347 | A1 | 8/2004 | Wisniewski | |
| 2007/0252001 | A1* | 11/2007 | Kail | G07C 9/257 |
| | | | | 235/380 |
| 2009/0189736 | A1* | 7/2009 | Hayashi | G06F 21/32 |
| | | | | 340/5.81 |
| 2022/0277066 | A1* | 9/2022 | Levine | B42D 25/305 |
| 2023/0136234 | A1* | 5/2023 | Ihara | G06F 21/32 |
| | | | | 713/186 |

FOREIGN PATENT DOCUMENTS

| | | | |
|---|---|---|---|
| JP | 5150056 | B2 * | 2/2013 |
| JP | 2014222445 | | 11/2014 |
| JP | 2020135528 | A * | 8/2020 |
| JP | 2020181473 | | 11/2020 |
| JP | 7556212 | B2 * | 9/2024 |
| WO | WO-9419770 | A1 * | 9/1994 ............. B42D 25/23 |

OTHER PUBLICATIONS

"Written Opinion of the International Searching Authority (Form PCT/ISA/237) of PCT/JP2022/002189," mailed on Apr. 12, 2022, with English translation thereof, pp. 1-8.
"Search Report of Europe Counterpart Application", issued on Jun. 10, 2024, pp. 1-9.
"Office Action of Japan Counterpart Application", issued on Jun. 10, 2025, with English translation thereof, p. 1-p. 6.
"Office Action of Europe Counterpart Application", issued on Dec. 17, 2025, p. 1-p. 11.

* cited by examiner

FIG. 1
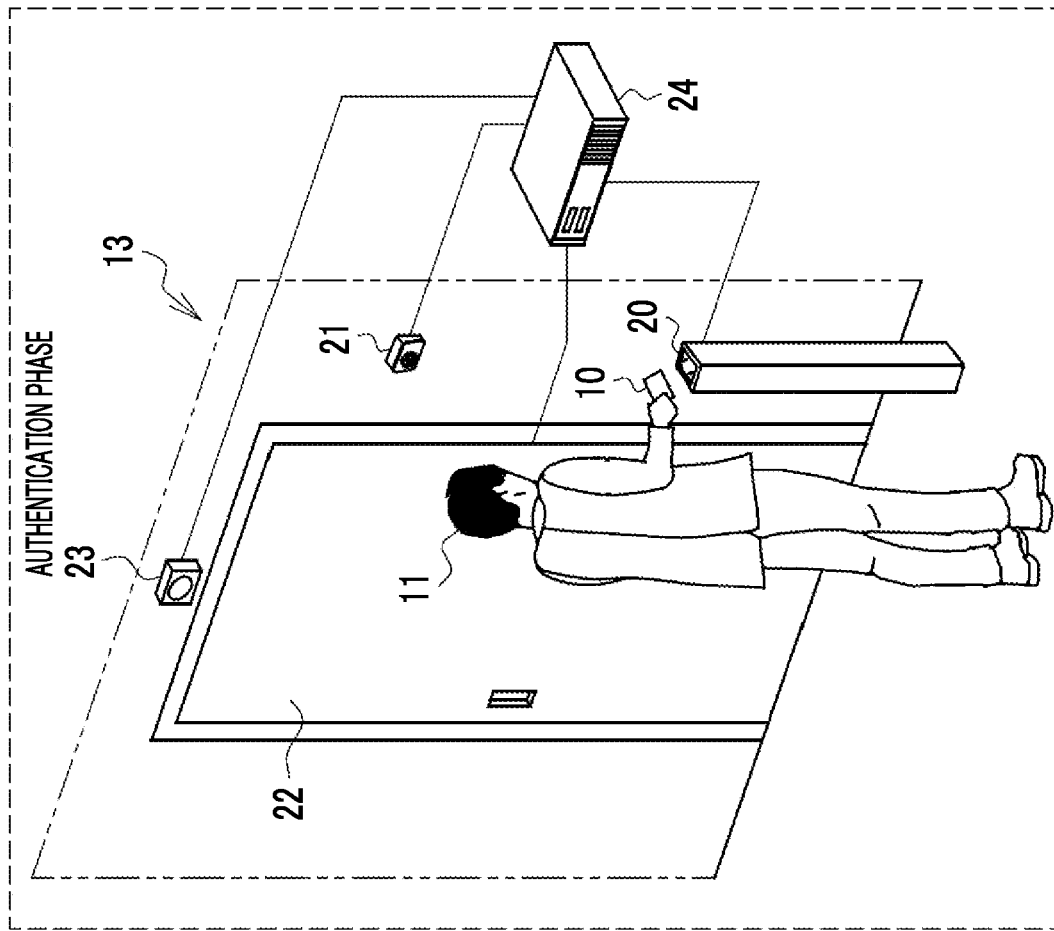
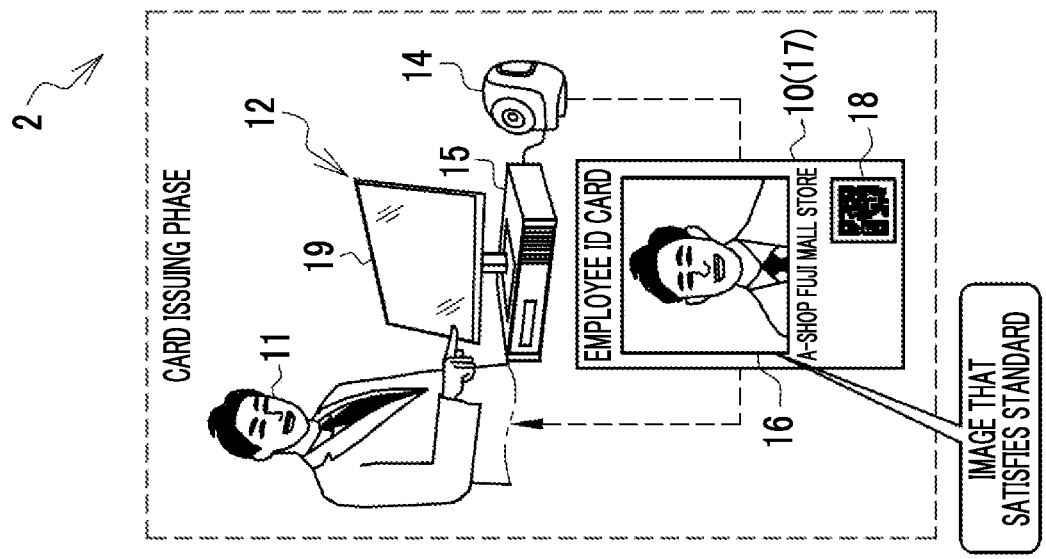

Authentication System, Operation Method of Authentication System, and Operation Program of Authentication System

CROSS-REFERENCE TO RELATED APPLICATIONS

This application is a continuation application of International Application No. PCT/JP2022/002189 filed on Jan. 21, 2022, the disclosure of which is incorporated herein by reference in its entirety. Further, this application claims priority from Japanese Patent Application No. 2021-010293 filed on Jan. 26, 2021, the disclosure of which is incorporated herein by reference in its entirety.

BACKGROUND

1. Technical Field

The technology of the present disclosure relates to an authentication system, an operation method of an authentication system, and an operation program of an authentication system.

2. Description of the Related Art

JP2014-222445A describes an authentication system that authenticates a user using an authentication code representing facial feature information extracted from a facial image of the user. In the authentication system described in JP2014-222445A, the authentication code is transmitted to a mobile terminal of the user, and the authentication code is displayed on a display unit of the mobile terminal. Then, an image of the displayed authentication code and the facial image of the user are captured, and the facial feature information decoded from the captured image of the authentication code is collated with the facial feature information extracted from the captured facial image, so that authentication is performed.

SUMMARY

As described above, in JP2014-222445A, the authentication code is transmitted to the mobile terminal of the user, and the authentication code is displayed on the display unit of the mobile terminal. Therefore, it is not easy to use for a person who does not possess a mobile terminal or a person who possesses a mobile terminal but is not familiar with the handling. In addition, in a situation in which the mobile terminal cannot be used, such as in a place where the communication environment is not established, the authentication cannot be performed in the first place.

One embodiment according to the technology of the present disclosure provides a highly convenient authentication system, an operation method of the authentication system, and an operation program of the authentication system.

According to the present disclosure, there is provided an authentication system comprising: a processor; and a memory connected to or incorporated in the processor, the processor having: a first processor configured to perform a card issuing task of issuing an ID card of a user; and a second processor configured to perform an authentication task of using the ID card to determine whether or not to authenticate the user as a legitimate user, in which the first processor is configured to, as the card issuing task: acquire a first facial image of the user; extract first facial feature information from the first facial image; generate an authentication code representing the first facial feature information; and cause a printer to print the authentication code and a display facial image of the user on a card medium to create the ID card, and the second processor is configured to, as the authentication task: acquire the authentication code printed on the ID card possessed by the user and a second facial image of the user; decode the first facial feature information from the authentication code; extract second facial feature information from the second facial image using the same algorithm as used in a case of extracting the first facial feature information from the first facial image; collate the first facial feature information with the second facial feature information; and perform the determination based on a collation result.

It is preferable that first identification information indicating that the ID card is issued by the card issuing task is added to the ID card, and that the second processor is configured to, in a case in which the first identification information is improper, determine that the user is not the legitimate user regardless of the collation result.

It is preferable that the second processor is configured to receive input of second identification information indicating that a qualified person has confirmed that the ID card is issued by the card issuing task for the user who attempts to receive authentication for a first time.

It is preferable that the second processor is configured to: store third identification information indicating that the ID card is issued by the card issuing task in a storage unit; and invalidate the third identification information for the user who has lost a qualification of the legitimate user.

It is preferable that the first facial image is an image that satisfies a standard set in advance. It is preferable that the display facial image is the first facial image. Further, It is preferable that the display facial image is an image that is not bound by the standard.

It is preferable that the first processor is configured to control an operation of a printer-equipped digital camera to cause the printer-equipped digital camera to capture the first facial image and print the authentication code and the display facial image on the card medium.

According to the present disclosure, there is provided an operation method of an authentication system, the operation method being for performing a card issuing task of issuing an ID card of a user and an authentication task of using the ID card to determine whether or not to authenticate the user as a legitimate user, the operation method comprising: as the card issuing task, acquiring a first facial image of the user; extracting first facial feature information from the first facial image; generating an authentication code representing the first facial feature information; and causing a printer to print the authentication code and a display facial image of the user on a card medium to create the ID card, and as the authentication task, acquiring the authentication code printed on the ID card possessed by the user and a second facial image of the user; decoding the first facial feature information from the authentication code; extracting second facial feature information from the second facial image using the same algorithm as used in a case of extracting the first facial feature information from the first facial image; collating the first facial feature information with the second facial feature information; and performing the determination based on a collation result.

According to the present disclosure, there is provided an operation program of an authentication system, the operation program being for performing a card issuing task of issuing an ID card of a user and an authentication task of using the ID card to determine whether or not to authenticate the user as a legitimate user, the operation program causing a computer to execute a process comprising: as the card issuing task, acquiring a first facial image of the user; extracting first facial feature information from the first facial image; generating an authentication code representing the first facial feature information; and causing a printer to print the authentication code and a display facial image of the user on a card medium to create the ID card, and as the authentication task, acquiring the authentication code printed on the ID card possessed by the user and a second facial image of the user; decoding the first facial feature information from the authentication code; extracting second facial feature information from the second facial image using the same algorithm as used in a case of extracting the first facial feature information from the first facial image; collating the first facial feature information with the second facial feature information; and performing the determination based on a collation result.

According to the technology of the present disclosure, it is possible to provide a highly convenient authentication system, an operation method of the authentication system, and an operation program of the authentication system.

BRIEF DESCRIPTION OF THE DRAWINGS

Exemplary embodiments according to the technique of the present disclosure will be described in detail based on the following figures, wherein:

FIG. 1 is a diagram showing an authentication system;

DETAILED DESCRIPTION

First Embodiment

Figure 2:
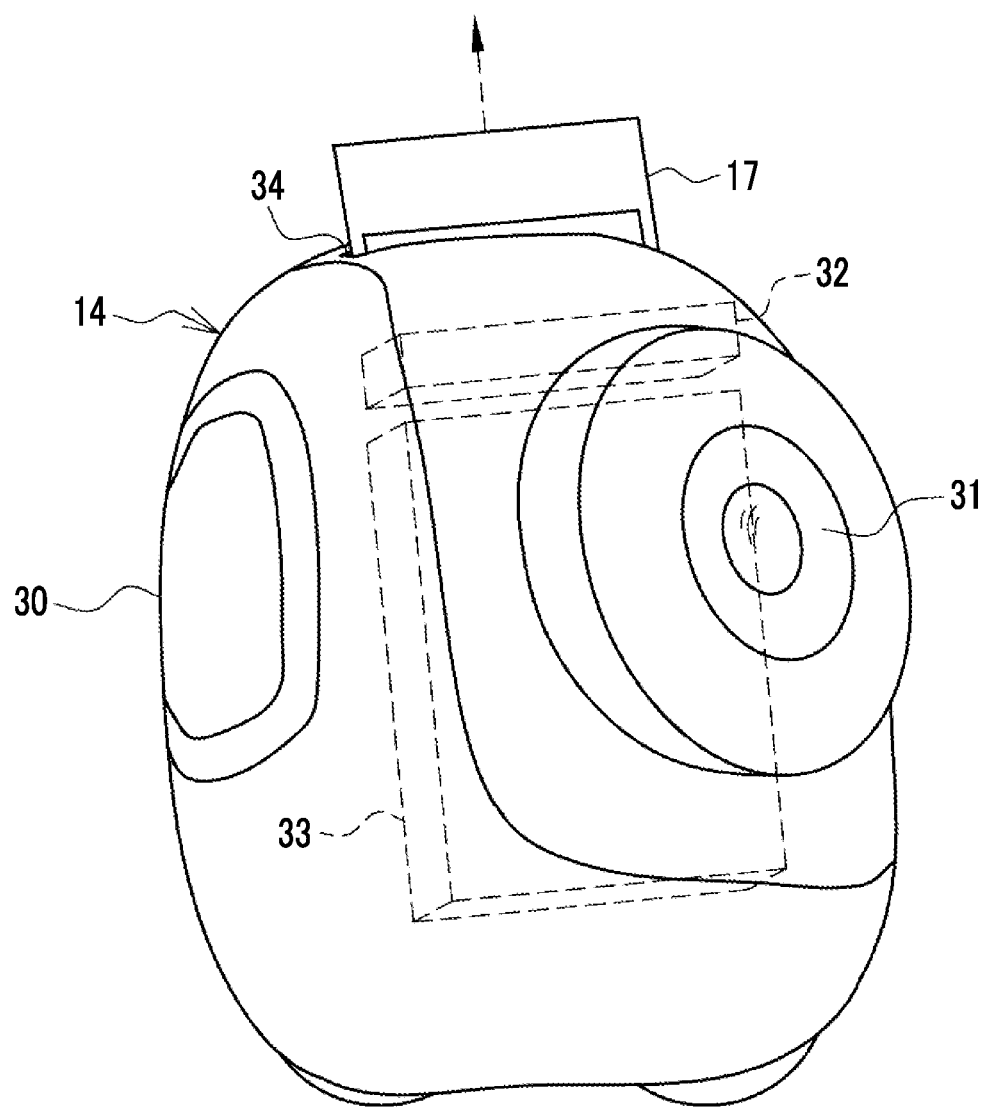
FIG. 2 is a diagram showing a printer-equipped digital camera.

As shown in FIG. 1 as an example, an authentication system 2 is a system that authenticates a user 11 using an ID (Identification) card 10. The authentication system 2 is composed of a card issuing unit 12 and an authentication unit 13. The card issuing unit 12 and the authentication unit 13 operate independently of each other (stand-alone), and data is not exchanged between them.

The card issuing unit 12 is used in a card issuing phase, which is a phase of issuing the ID card 10. The card issuing unit 12 is installed, for example, in a security room of an introduction facility of the authentication system 2. The introduction facility of the authentication system 2 is a shopping mall, a building, a company, a medical facility, a research facility, or the like. Here, a shopping mall named "Fuji Mall" is described as an example of the introduction facility.

The authentication unit 13 is used in an authentication phase, which is a phase of using the ID card 10 to determine whether or not to authenticate the user 11 as a legitimate user. The legitimate user is the user 11 who is permitted to enter and exit the introduction facility of the authentication system 2. The authentication unit 13 is installed, for example, on the entrance side of an entrance/exit for commuting used by the legitimate user.

The card issuing unit 12 comprises a printer-equipped digital camera 14 and a card issuing terminal 15. Under the control of the card issuing terminal 15, the printer-equipped digital camera 14 captures, for example, an image of the face of the user 11 who will work as a new employee in the introduction facility from now. Then, a first facial image 16 obtained in this way is printed on an instant film 17 (see also FIG. 2). In addition, the printer-equipped digital camera 14 prints an authentication code 18 on the instant film 17 in addition to the first facial image 16. Here, a Quick Response (QR) code (registered trademark) is employed as the authentication code 18. In this way, the instant film 17 on which the first facial image 16, the authentication code 18, the store name, the facility name, and the like are printed is distributed to the user 11 as the ID card 10. The printer-equipped digital camera 14 is an example of a "printer" according to the technology of the present disclosure. The instant film 17 is an example of a "card medium" according to the technology of the present disclosure. The first facial image 16 is an example of a "display facial image" according to the technology of the present disclosure.

The card issuing terminal 15 has a touch panel display 19. A guide screen for guiding the capturing of the first facial image 16 is displayed on the touch panel display 19. The user 11 captures the first facial image 16 in accordance with the guide screen. A live preview image captured by the printer-equipped digital camera 14 is displayed on the guide screen. In addition, a frame indicating the position and the size of the face conforming to a standard set in advance, such as a standard of a typical identification photo, and cautionary notes are displayed on the guide screen. Further, an input box for the store name and the facility name to be printed on the ID card 10, an imaging instruction button for issuing an instruction to capture the first facial image 16, and the like are displayed on the guide screen. The cautionary notes are, for example, facing forward, no hat, no mask, no sunglasses, no obstruction of the eyes by hair, no closed eyes, no shadows, and the like. The imaging instruction button can be operated only in a case in which the face of the user 11 fits within the frame and all the cautionary notes are observed. Therefore, the first facial image 16 is an image that satisfies the standard set in advance. In addition, whether or not the first facial image 16 satisfies the standard may be determined by a dedicated application program.

After the imaging instruction button on the guide screen is operated to capture the first facial image 16, a print instruction screen for issuing an instruction to print the first facial image 16 and the like on the instant film 17 is displayed on the touch panel display 19. The print instruction button for issuing an instruction to print a sample image of the ID card 10 to be printed from now, the first facial image 16, and the like is displayed on the print instruction screen.

The authentication unit 13 comprises a code reader 20, an authentication camera 21, a security door 22, a speaker 23, and an authentication terminal 24. The code reader 20 reads the authentication code 18 from the ID card 10 of the user 11 who attempts to receive the authentication. The authentication camera 21 captures a second facial image 95 (see FIG. 7) of the user 11 standing in front of the authentication camera 21 under the control of the authentication terminal 24. The security door 22 is an automatic door that opens and closes the entrance/exit for commuting used by the legitimate user, and is normally locked. The speaker 23 outputs audio related to the authentication. The authentication terminal 24 is installed at, for example, a place away from the security door 22 or the like, such as a security room.

In a case in which the user 11 approaches the security door 22, a guidance audio, such as "Please hold the authentication code of the ID card over the code reader.", is output from the speaker 23. In addition, in a case in which the authentication code 18 is read by the code reader 20, a guidance audio, such as "Please turn your face to the camera.", is output from the speaker 23.

As shown in FIG. 2 as an example, the printer-equipped digital camera 14 has a box-shaped main body 30 that is rounded as a whole. The main body 30 is provided with a camera unit 31 for capturing the first facial image 16, a printer unit 32 for printing the first facial image 16 and the like on the instant film 17, a film pack 33 for the instant film 17, and the like. The film pack 33 is interchangeably loaded in the main body 30. A plurality of unused instant films 17, for example, 10 films are accommodated in the film pack 33. A discharge port 34 through which the instant film 17 with the first facial image 16 and the like printed thereon is discharged is formed on the upper part of the main body 30.

Figure 3:
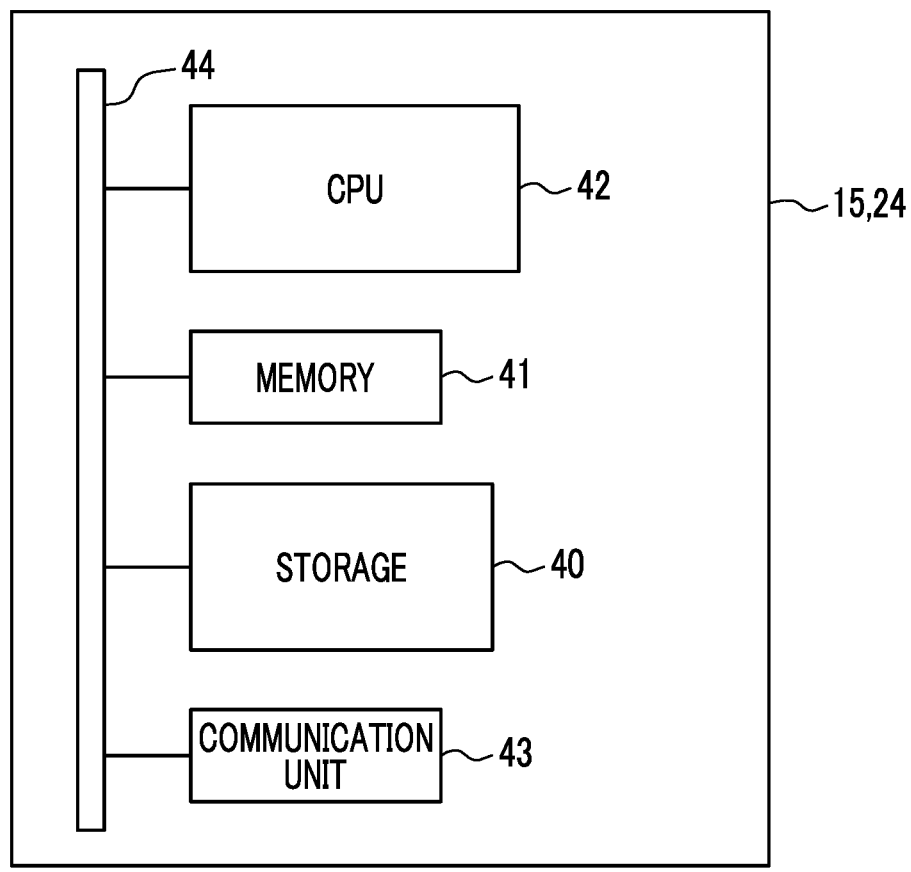
FIG. 3 is a block diagram showing a computer that constitutes a card issuing terminal and an authentication terminal.

As shown in FIG. 3 as an example, computers constituting the card issuing terminal 15 and the authentication terminal 24 have basically the same configuration and each comprise a storage 40, a memory 41, a central processing unit (CPU) 42, a communication unit 43, and the like. These are interconnected via a bus line 44.

The storage 40 is a hard disk drive that is incorporated in each of the computers constituting the card issuing terminal 15 and the authentication terminal 24 or that is connected through a cable or a network. Alternatively, the storage 40 is a disk array in which a plurality of hard disk drives are provided consecutively. The storage 40 stores a control program, such as an operating system, various application programs, various types of data associated with these programs, and the like. A solid state drive may be used instead of the hard disk drive.

The memory 41 is a work memory for the CPU 42 to execute processing. The CPU 42 loads the program stored in the storage 40 into the memory 41 and executes processing in accordance with the program. With this, the CPU 42 controls each unit of the computer in an integrated manner. The communication unit 43 is an interface that controls transmission of various types of data with other devices.

In the following description, each unit of the computer constituting the card issuing terminal 15 is distinguished by the subscript "A", and each unit of the computer that constitutes the authentication terminal 24 is distinguished by the subscript "B".

Figure 4:
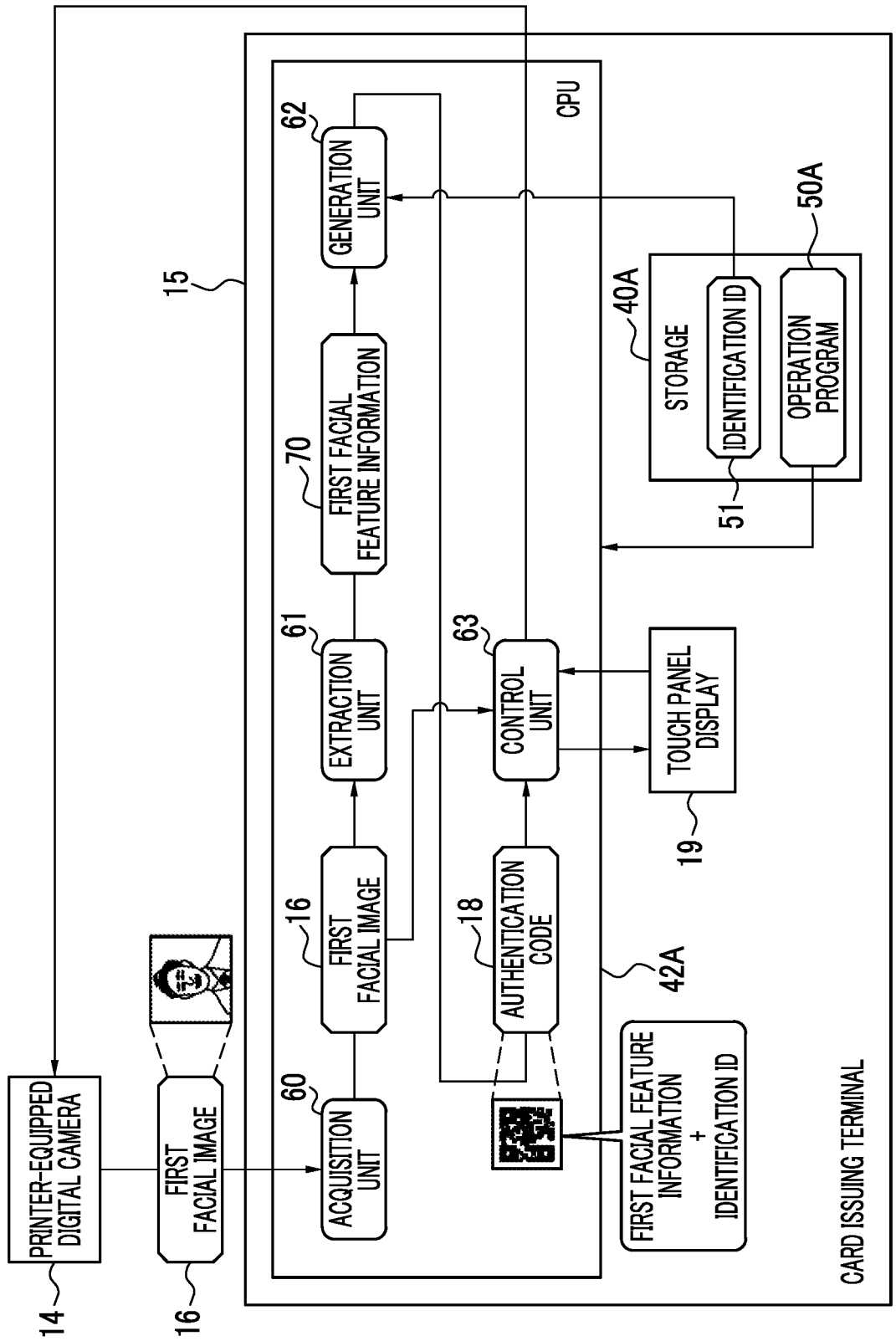
FIG. 4 is a diagram showing processing units of a CPU of the card issuing terminal.

As shown in FIG. 4 as an example, an operation program 50A is stored in a storage 40A of the card issuing terminal 15. The operation program 50A is an application program for causing the computer constituting the card issuing terminal 15 to function as a part of the authentication system 2. That is, the operation program 50A is an example of an "operation program of an authentication system" according to the technology of the present disclosure. An identification ID 51 is also stored in the storage 40A. The identification ID 51 is an example of "first identification information" according to the technology of the present disclosure.

In a case in which the operation program 50A is activated, a CPU 42A of the computer constituting the card issuing terminal 15 functions as an acquisition unit 60, an extraction unit 61, a generation unit 62, and a control unit 63 in cooperation with the memory 41 and the like. The CPU 42A performs a card issuing task of issuing the ID card 10 through these processing units. That is, the CPU 42A is an example of a "first processor" according to the technology of the present disclosure.

The acquisition unit 60 acquires the first facial image 16 from the printer-equipped digital camera 14. The acquisition unit 60 outputs the first facial image 16 to the extraction unit 61.

The extraction unit 61 extracts first facial feature information 70 from the first facial image 16. More specifically, the extraction unit 61 specifies a region of the face of the user 11 appearing in the first facial image 16 and performs well-known feature extraction processing on the specified region of the face. In the feature extraction processing, the extraction unit 61 extracts, for example, the size of each of the component parts of the face, such as eyebrows, eyes, nose, mouth, and ears, as the first facial feature information 70. In addition, in the feature extraction processing, the extraction unit 61 extracts the positions of feature points of each component part, such as the ends of eyebrows, the inner corners of eyes, the outer corners of eyes, the tip of the nose, and the corners of the mouth, a positional relationship of each component part, such as the distance between the inner corners of both eyes, and the like, as the first facial feature information 70. The extraction unit 61 outputs the first facial feature information 70 to the generation unit 62.

In addition to the first facial feature information 70 from the extraction unit 61, the identification ID 51 is input to the generation unit 62 from the storage 40A. The identification ID 51 is, for example, a facility ID of the introduction facility of the authentication system 2 and is stored in the storage 40A at the time of introducing the authentication system 2. The generation unit 62 generates the authentication code 18 representing the first facial feature information 70 and the identification ID 51. The generation unit 62 encrypts the first facial feature information 70 and the identification ID 51 to create the authentication code 18. The generation unit 62 outputs the authentication code 18 to the control unit 63. As the identification ID 51, the store ID of the store to which the user 11 belongs, the device ID of the printer-equipped digital camera 14, or the like may be used.

The control unit 63 controls the display of various screens on the touch panel display 19. In addition, the control unit 63 receives various instructions input via the touch panel display 19. There are various instructions including an imaging instruction 75 (see FIG. 5) of the first facial image 16 through the imaging instruction button on the guide screen and a print instruction 78 (see FIG. 6) of the first facial image 16 and the like through the print instruction button on the print instruction screen. The control unit 63 controls the operations of the printer-equipped digital camera 14 in response to various instructions.

Figure 5:
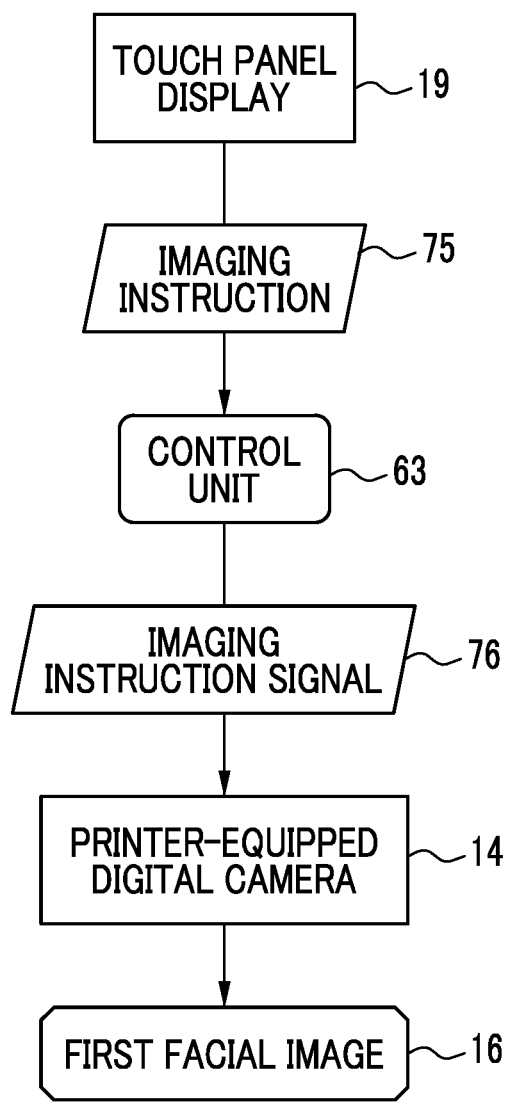
FIG. 5 is a diagram showing processing in a case in which an imaging instruction from a touch panel display is received by a control unit.

As shown in FIG. 5 as an example, in a case in which the imaging instruction button on the guide screen is operated and the imaging instruction 75 is input from the touch panel display 19, the control unit 63 transmits an imaging instruction signal 76 to the printer-equipped digital camera 14. In a case in which the imaging instruction signal 76 is received, the printer-equipped digital camera 14 operates the camera unit 31 to capture the first facial image 16.

Figure 6:
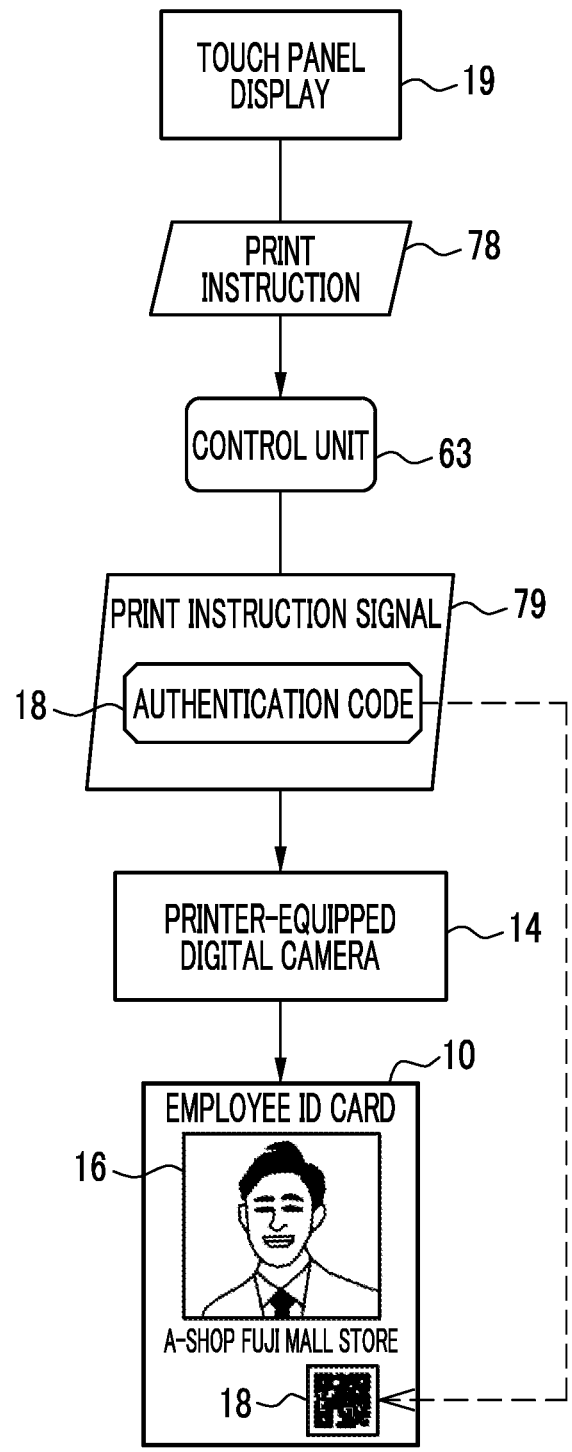
FIG. 6 is a diagram showing processing in a case in which a print instruction from the touch panel display is received by the control unit.

As shown in FIG. 6 as an example, in a case in which the print instruction button on the print instruction screen is operated and the print instruction 78 is input from the touch panel display 19, the control unit 63 transmits a print instruction signal 79 to the printer-equipped digital camera 14. The print instruction signal 79 includes the authentication code 18. In a case in which the print instruction signal 79 is received, the printer-equipped digital camera 14 operates the printer unit 32 to print the first facial image 16, the authentication code 18, and the like on the instant film 17 to create the ID card 10.

Figure 7:
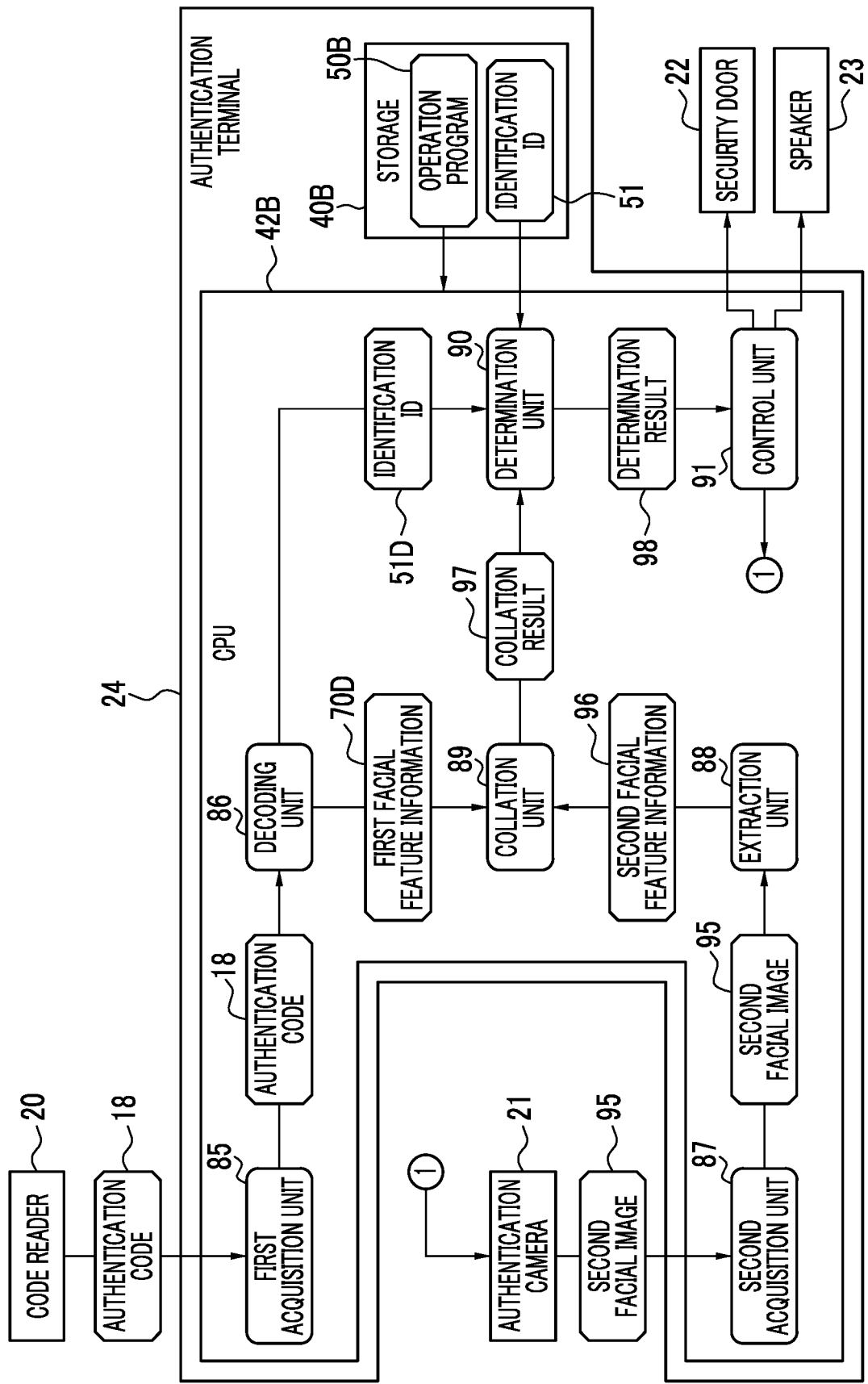
FIG. 7 is a diagram showing processing units of a CPU of the authentication terminal.

As shown in FIG. 7 as an example, an operation program 50B is stored in a storage 40B of the authentication terminal 24. The operation program 50B is an application program for causing the computer constituting the authentication terminal 24 to function as a part of the authentication system 2. That is, the operation program 50B is an example of the "operation program of the authentication system" according to the technology of the present disclosure. The identification ID 51 is stored in the storage 40B, like the storage 40A of the card issuing terminal 15.

In a case in which the operation program 50B is activated, a CPU 42B of the computer constituting the authentication terminal 24 functions as a first acquisition unit 85, a decoding unit 86, a second acquisition unit 87, an extraction unit 88, a collation unit 89, a determination unit 90, and a control unit 91 in cooperation with the memory 41 and the like. The CPU 42B performs an authentication task of using the ID card 10 to determine whether or not to authenticate the user 11 as the legitimate user through these processing units. That is, the CPU 42B is an example of a "second processor" according to the technology of the present disclosure.

The first acquisition unit 85 acquires the authentication code 18 read by the code reader 20. The first acquisition unit 85 outputs the authentication code 18 to the decoding unit 86.

The decoding unit 86 decodes the authentication code 18. The decoding unit 86 outputs first facial feature information 70D decoded from the authentication code 18 to the collation unit 89. In addition, the decoding unit 86 outputs identification ID 51D decoded from the authentication code 18 to the determination unit 90.

The second acquisition unit 87 acquires the second facial image 95 of the user 11 captured by the authentication camera 21. The second acquisition unit 87 outputs the second facial image 95 to the extraction unit 88.

The extraction unit 88 extracts second facial feature information 96 from the second facial image 95 using the same algorithm as used in a case in which the extraction unit 61 of the card issuing terminal 15 extracts the first facial feature information 70 from the first facial image 16. The extraction unit 88 outputs the second facial feature information 96 to the collation unit 89.

The collation unit 89 collates the first facial feature information 70D decoded from the authentication code 18 by the decoding unit 86 with the second facial feature information 96 extracted from the second facial image 95 by the extraction unit 88. The collation unit 89 outputs a collation result 97 between the first facial feature information 70D and the second facial feature information 96 to the determination unit 90.

In addition to the identification ID 51D from the decoding unit 86 and the collation result 97 from the collation unit 89, the identification ID 51 is input to the determination unit 90 from the storage 40B. The determination unit 90 determines whether or not to authenticate the user 11 as the legitimate user based on the collation result 97 and the identification IDs 51 and 51D. The determination unit 90 outputs a determination result 98 as to whether or not to authenticate the user 11 as the legitimate user to the control unit 91.

The control unit 91 controls the operation of the authentication camera 21 to cause the authentication camera 21 to capture the second facial image 95. In addition, the control unit 91 controls locking and unlocking of the security door 22 and opening and closing of the security door 22. Further, the control unit 91 controls the operation of the speaker 23.

Figure 8:
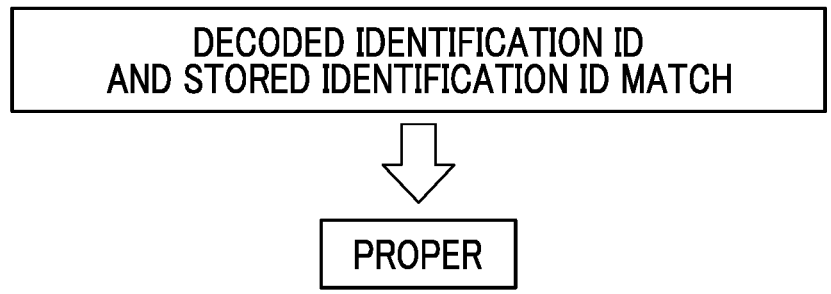
FIG. 8 is a diagram showing processing in a case in which an identification ID decoded by a decoding unit and an identification ID stored in a storage match.

As shown in FIG. 8 as an example, in a case in which the identification ID 51D decoded by the decoding unit 86 and the identification ID 51 stored in the storage 40B match, the determination unit 90 determines that the identification ID 51 is proper.

Figure 9:
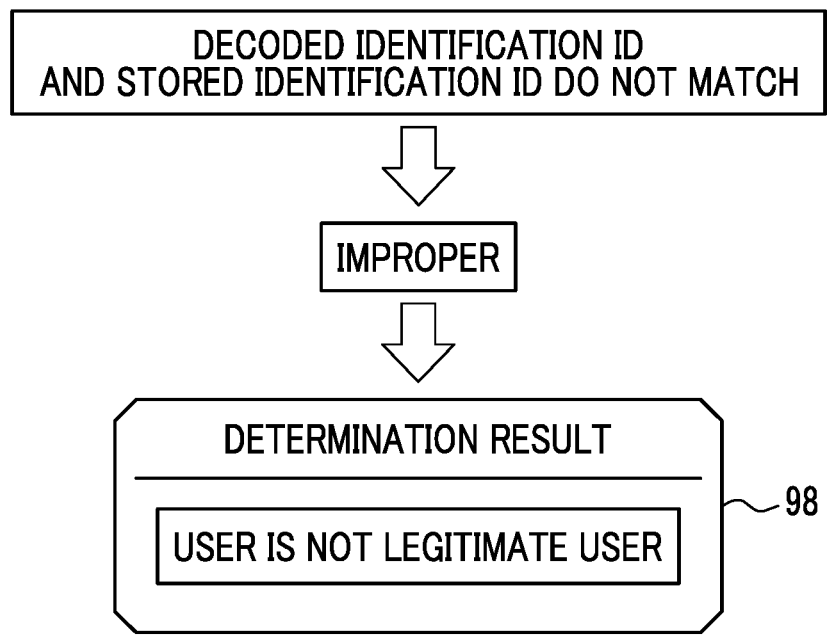
FIG. 9 is a diagram showing processing in a case in which the identification ID decoded by the decoding unit and the identification ID stored in the storage do not match.

On the other hand, as shown in FIG. 9 as an example, in a case in which the identification ID 51D decoded by the decoding unit 86 and the identification ID 51 stored in the storage 40B do not match, the determination unit 90 determines that the identification ID 51 is improper. In this case, the determination unit 90 outputs the determination result 98 indicating that the user 11 is not the legitimate user regardless of the collation result 97.

Figure 10:
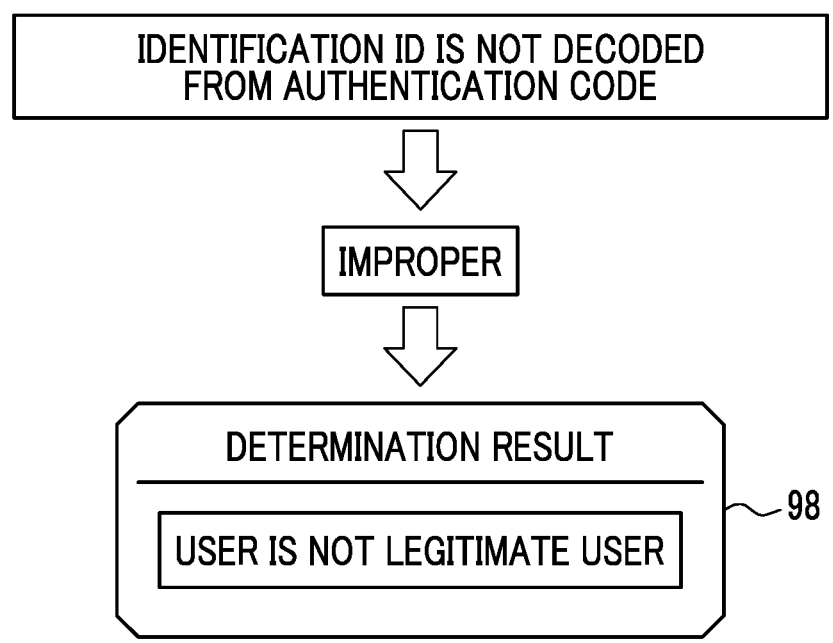
FIG. 10 is a diagram showing processing in a case in which the decoding unit does not decode the identification ID from an authentication code.

Further, as shown in FIG. 10 as an example, even in a case in which the identification ID 51 is not registered in the authentication code 18 and the decoding unit 86 does not decode the identification ID 51D from the authentication code 18, the determination unit 90 determines that the identification ID 51 is improper. Then, the determination result 98 indicating that the user 11 is not the legitimate user is output.

Figure 11:
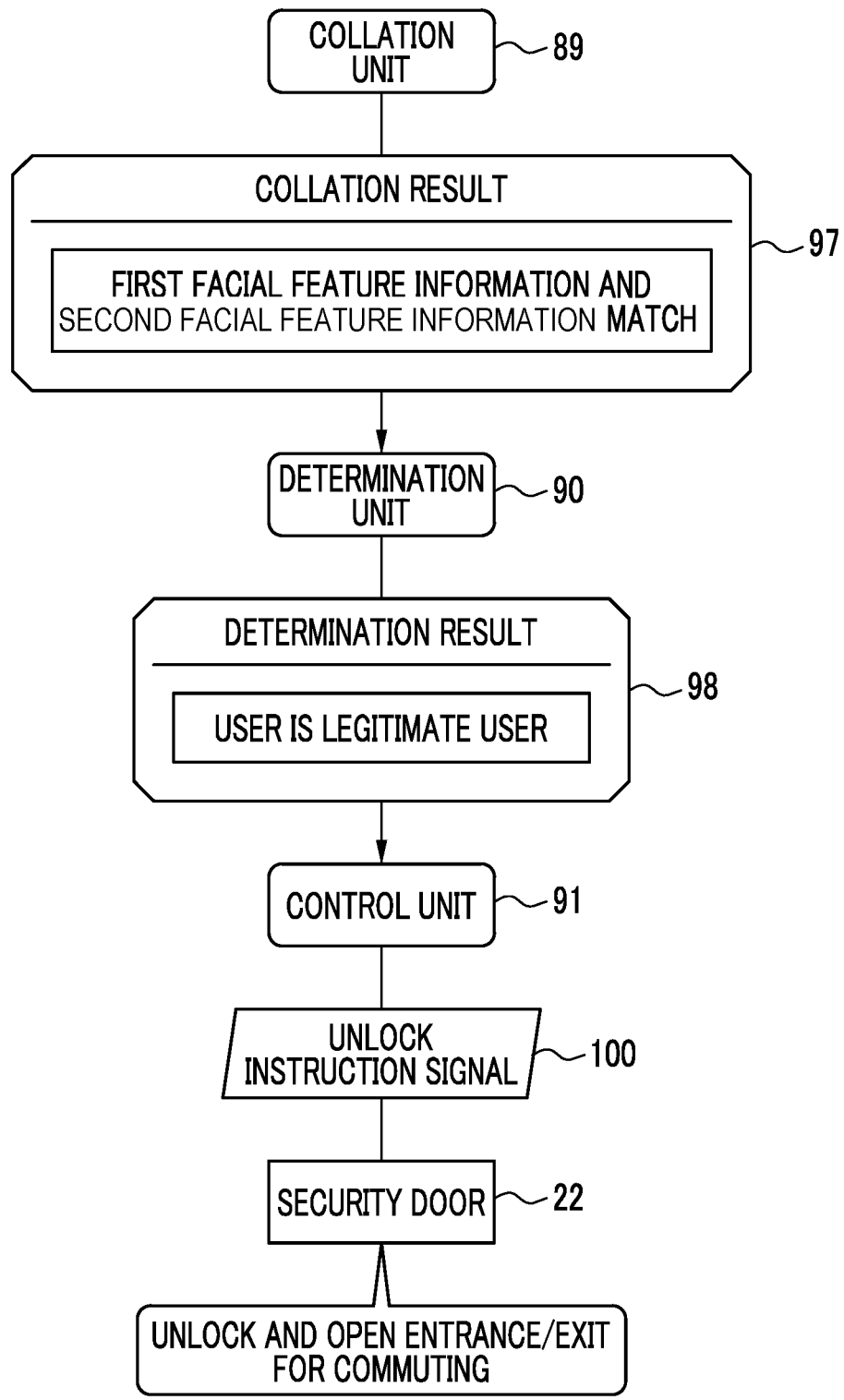
FIG. 11 is a diagram showing processing in a case in which a collation result indicates that first facial feature information and second facial feature information match.

As shown in FIG. 11 as an example, in a case in which the identification ID 51 is proper and the collation result 97 from the collation unit 89 indicates that the first facial feature information 70D and the second facial feature information 96 match, the determination unit 90 outputs the determination result 98 indicating that the user 11 is the legitimate user. The control unit 91 transmits an unlock instruction signal 100 to the security door 22 in a case in which the determination result 98 indicating that the user 11 is the legitimate user is input from the determination unit 90. In a case in which the unlock instruction signal 100 is received, the security door 22 is unlocked and the entrance/exit for commuting is temporarily opened.

Figure 12:
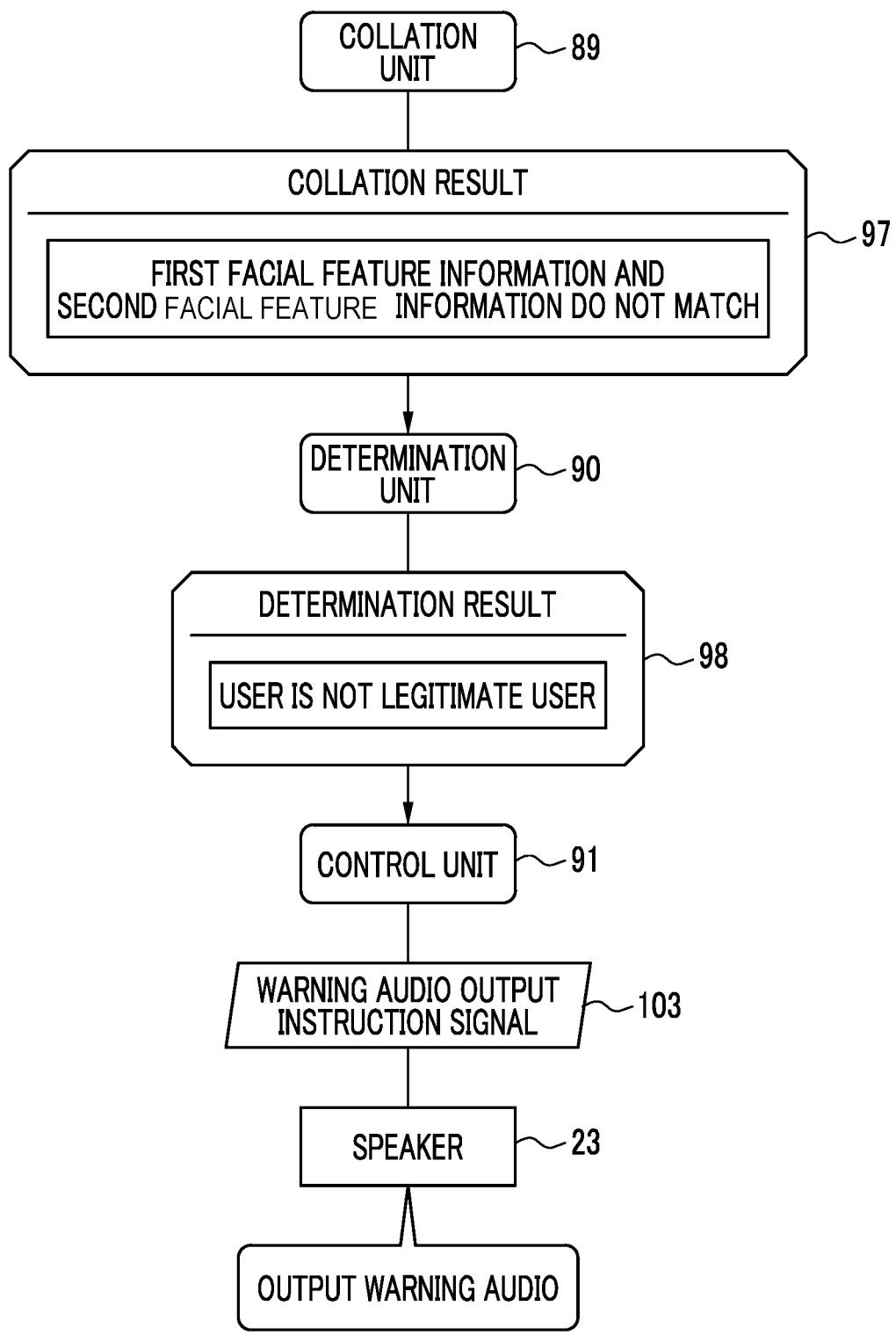
FIG. 12 is a diagram showing processing in a case in which the collation result indicates that the first facial feature information and the second facial feature information do not match.

As shown in FIG. 12 as an example, in a case in which the identification ID 51 is proper and the collation result 97 from the collation unit 89 indicates that the first facial feature information 70D and the second facial feature information 96 do not match, the determination unit 90 outputs the determination result 98 indicating that the user 11 is not the legitimate user. In a case in which the determination result 98 indicating that the user 11 is not the legitimate user is input from the determination unit 90, the control unit 91 does not transmit anything to the security door 22 and instead transmits a warning audio output instruction signal 103 to the speaker 23. In a case in which the warning audio output instruction signal 103 is received, the speaker 23 outputs a warning audio, such as "The ID card is invalid. Access is not permitted." In this case, since nothing is transmitted to the security door 22, the security door 22 remains locked. Even in a case shown in FIG. 9 in which the identification ID 51D decoded by the decoding unit 86 and the identification ID 51 stored in the storage 40B do not match and the determination unit 90 determines that the identification ID 51 is improper, the control unit 91 transmits the warning audio output instruction signal 103 to the speaker 23. Further, even in a case shown in FIG. 10 in which the decoding unit 86 does not decode the identification ID 51D from the authentication code 18 and the determination unit 90 determines that the identification ID 51 is improper, the control unit 91 transmits the warning audio output instruction signal 103 to the speaker 23. The warning audio may be a siren, a beep sound, or the like.

Figure 13:
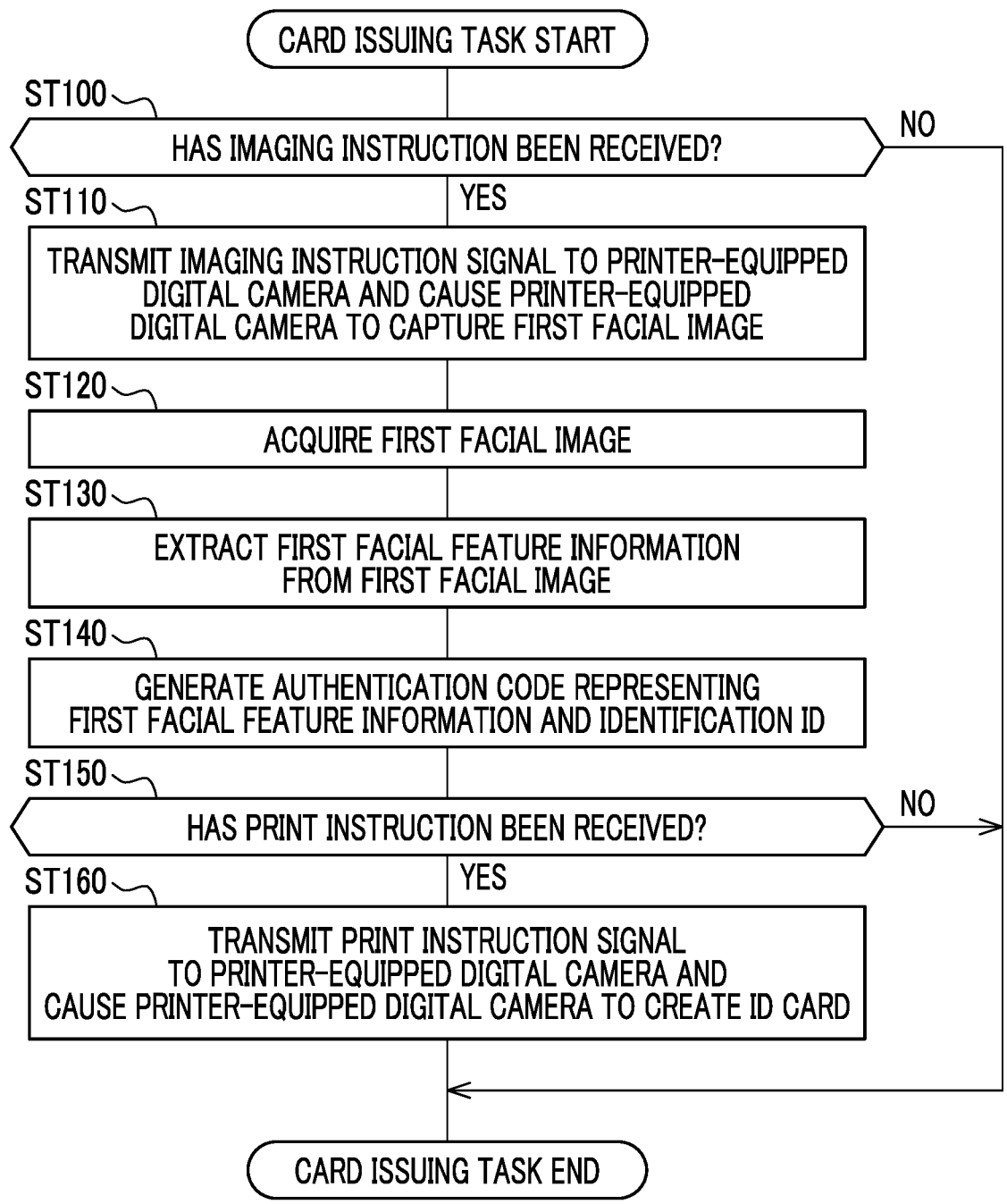
FIG. 13 is a flowchart showing a processing procedure of a card issuing task by the CPU of the card issuing terminal.
Figure 14:
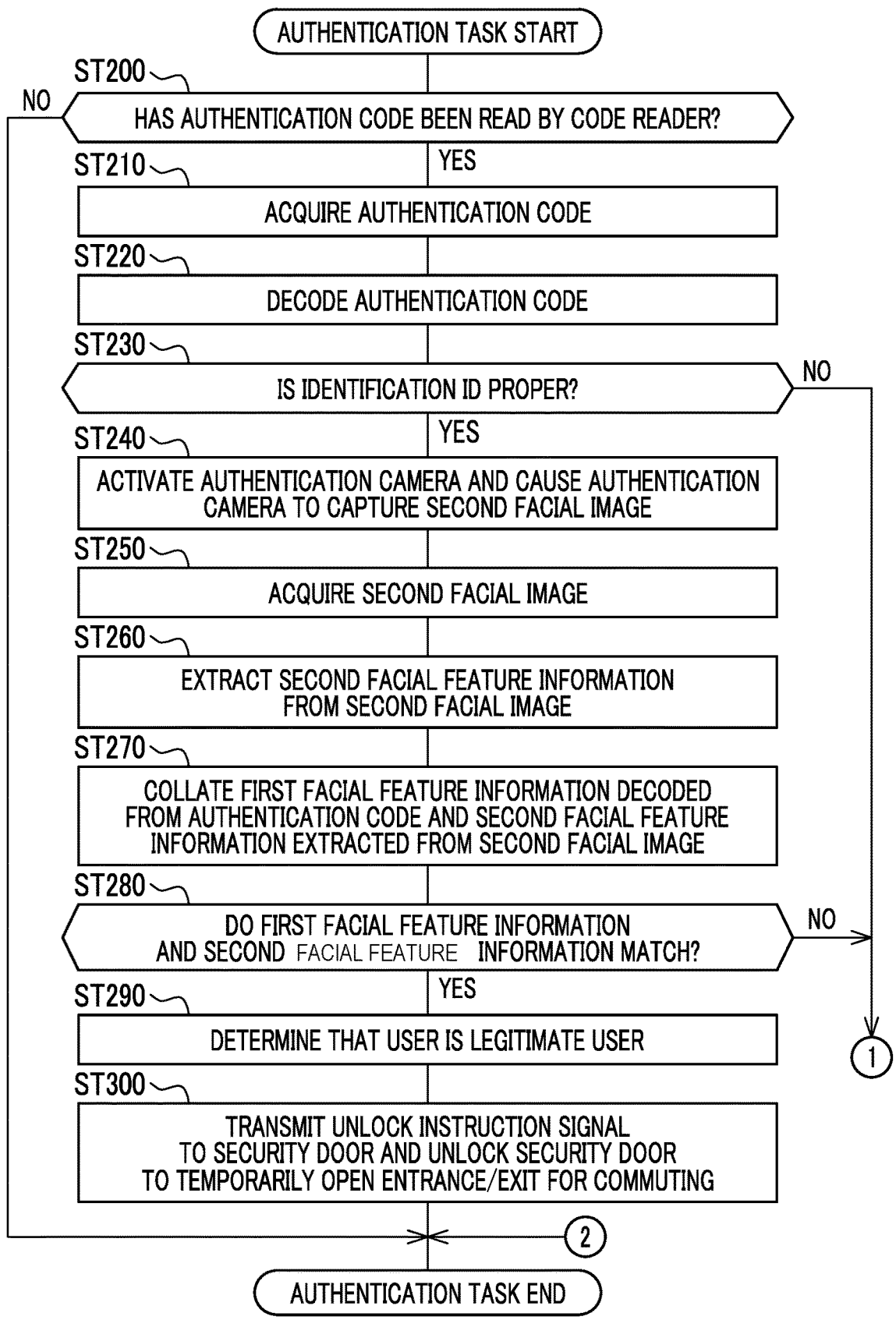
FIG. 14 is a flowchart showing a processing procedure of an authentication task by the CPU of the authentication terminal.
Figure 15:
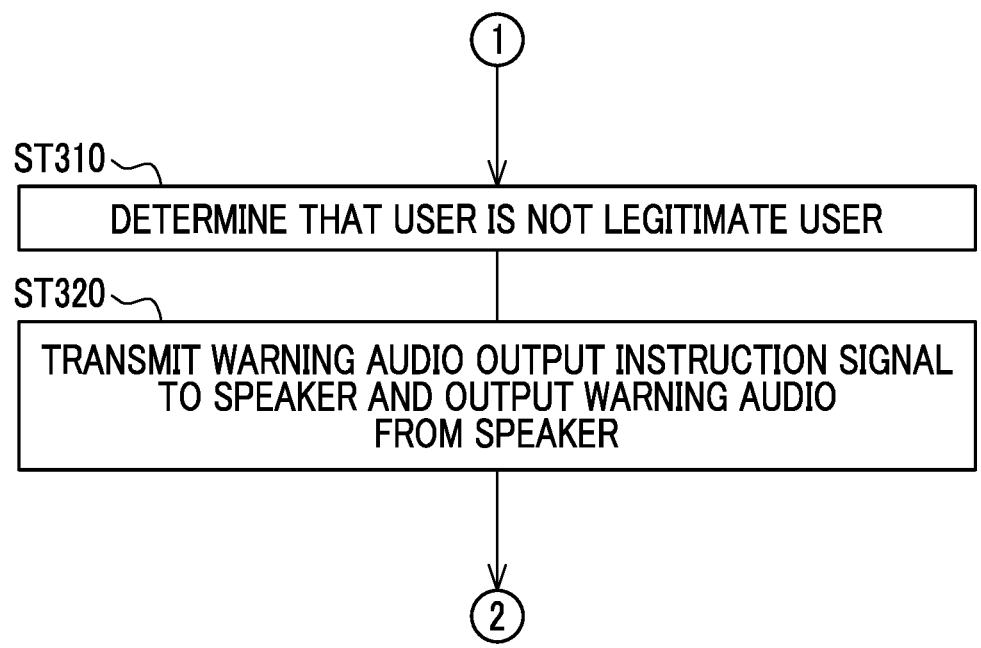
FIG. 15 is a flowchart showing a processing procedure of the authentication task by the CPU of the authentication terminal.

Next, the operation of the above-described configuration will be described with reference to the flowcharts shown in FIGS. 13 to 15.

First, the procedure of the card issuing task by the CPU 42A of the card issuing terminal 15 will be described with reference to the flowchart shown in FIG. 13.

In a case in which the operation program 50A is activated in the card issuing terminal 15, the CPU 42A of the card issuing terminal 15 functions as the acquisition unit 60, the extraction unit 61, the generation unit 62, and the control unit 63, as shown in FIG. 4.

As shown in FIG. 5, in a case in which the imaging instruction button on the guide screen is operated, the imaging instruction 75 is received by the control unit 63 (YES in step ST100). As a result, the imaging instruction signal 76 is transmitted from the control unit 63 to the printer-equipped digital camera 14, and the first facial image 16 of the user 11 is captured by the camera unit 31 of the printer-equipped digital camera 14 (step ST110). The first facial image 16 is transmitted from the printer-equipped digital camera 14 to the card issuing terminal 15.

The first facial image 16 from the printer-equipped digital camera 14 is input to and acquired by the acquisition unit 60 (step ST120). The first facial image 16 is output from the acquisition unit 60 to the extraction unit 61.

The extraction unit 61 extracts the first facial feature information 70 from the first facial image 16 (step ST130). The first facial feature information 70 is output from the extraction unit 61 to the generation unit 62.

The generation unit 62 generates the authentication code 18 representing the first facial feature information 70 and the identification ID 51 (step ST140). The authentication code 18 is output from the generation unit 62 to the control unit 63.

As shown in FIG. 6, in a case in which the print instruction button on the print instruction screen is operated, the print instruction 78 is received by the control unit 63 (YES in step ST150). As a result, the print instruction signal 79 is transmitted from the control unit 63 to the printer-equipped digital camera 14, and the first facial image 16, the authentication code 18, and the like are printed on the instant film 17 by the printer unit 32 of the printer-equipped digital camera 14, and the ID card 10 is created (step ST160). The ID card 10 is distributed to the user 11.

Subsequently, the procedure of the authentication task by the CPU 42B of the authentication terminal 24 will be described with reference to the flowcharts shown in FIGS. 14 and 15.

In a case in which the operation program 50B is activated in the authentication terminal 24, as shown in FIG. 7, the CPU 42B of the authentication terminal 24 functions as the first acquisition unit 85, the decoding unit 86, the second acquisition unit 87, the extraction unit 88, the collation unit 89, the determination unit 90, and the control unit 91.

In a case in which the authentication code 18 of the ID card 10 is held over the code reader 20 by the user 11 and the authentication code 18 is read by the code reader 20 (YES in step ST200), the authentication code 18 is input to and acquired by the first acquisition unit 85 (step ST210). The authentication code 18 is output from the first acquisition unit 85 to the decoding unit 86.

The authentication code 18 is decoded by the decoding unit 86 (step ST220). The first facial feature information 70D decoded from the authentication code 18 is output from the decoding unit 86 to the collation unit 89. Further, the identification ID 51D decoded from the authentication code 18 is output from the decoding unit 86 to the determination unit 90.

As shown in FIG. 8, in a case in which the identification ID 51D decoded by the decoding unit 86 and the identification ID 51 stored in the storage 40B match, the determination unit 90 determines that the identification ID 51 is proper (YES in step ST230). In this case, the authentication camera 21 is activated by the control unit 91, and the second facial image 95 of the user 11 is captured (step ST240).

The second facial image 95 is input to and acquired by the second acquisition unit 87 (step ST250). The second facial image 95 is output from the second acquisition unit 87 to the extraction unit 88.

The second facial feature information 96 from the second facial image 95 is extracted by the extraction unit 88 (step ST260). The second facial feature information 96 is output from the extraction unit 88 to the collation unit 89.

By the collation unit 89, the first facial feature information 70D decoded by the decoding unit 86 from the authentication code 18 is collated with the second facial feature information 96 extracted from the second facial image 95 by the extraction unit 88 (step ST270). The collation result 97 is output from the collation unit 89 to the determination unit 90.

As shown in FIG. 11, in a case in which the collation result 97 indicates that the first facial feature information 70D and the second facial feature information 96 match (YES in step ST280), the determination unit 90 determines that the user 11 is the legitimate user (step ST290). In this case, the determination result 98 indicating that the user 11 is the legitimate user is output from the determination unit 90 to the control unit 91.

In a case in which the determination result 98 indicating that the user 11 is the legitimate user is input to the control unit 91, the unlock instruction signal 100 is transmitted from the control unit 91 to the security door 22. As a result, the security door 22 is unlocked and the entrance/exit for commuting is temporarily opened (step ST300).

As shown in FIG. 9, in a case in which the identification ID 51D decoded by the decoding unit 86 and the identification ID 51 stored in the storage 40B do not match, the determination unit 90 determines that the identification ID 51 is improper (NO in step ST230). Further, as shown in FIG. 10, even in a case in which the decoding unit 86 does not decode the identification ID 51D from the authentication code 18, the determination unit 90 determines that the identification ID 51 is improper (NO in step ST230). In these cases, the determination unit 90 determines that the user 11 is not the legitimate user (step ST310). Then, the determination result 98 indicating that the user 11 is not the legitimate user is output from the determination unit 90 to the control unit 91.

In addition, as shown in FIG. 12, even in a case in which the collation result 97 indicates that the first facial feature information 70D and the second facial feature information 96 do not match (NO in step ST280), the determination unit 90 determines that the user 11 is not the legitimate user (step ST310). Then, the determination result 98 indicating that the user 11 is not the legitimate user is output from the determination unit 90 to the control unit 91.

In a case in which the determination result 98 indicating that the user 11 is not the legitimate user is input to the control unit 91, the warning audio output instruction signal 103 is transmitted from the control unit 91 to the speaker 23. As a result, the warning audio is output from the speaker 23 (step ST320).

As described above, the CPU 42A of the card issuing terminal 15 comprises the acquisition unit 60, the extraction unit 61, the generation unit 62, and the control unit 63. The acquisition unit 60 acquires the first facial image 16 of the user 11. The extraction unit 61 extracts first facial feature information 70 from the first facial image 16. The generation unit 62 generates the authentication code 18 representing the first facial feature information 70. The control unit 63 causes the printer-equipped digital camera 14 to print the authentication code 18 and the first facial image 16 on the instant film 17 to create the ID card 10.

In addition, the CPU 42B of the authentication terminal 24 comprises the first acquisition unit 85, the decoding unit 86, the second acquisition unit 87, the extraction unit 88, the collation unit 89, and the determination unit 90. The first acquisition unit 85 acquires the authentication code 18 printed on the ID card 10 possessed by the user 11. The decoding unit 86 decodes the first facial feature information 70D from the authentication code 18. The second acquisition unit 87 acquires the second facial image 95 of the user 11. The extraction unit 88 extracts the second facial feature information 96 from the second facial image 95 using the same algorithm as used in a case in which the first facial feature information 70 is extracted from the first facial image 16. The collation unit 89 collates the first facial feature information 70D with the second facial feature information 96. The determination unit 90 determines whether or not to authenticate the user 11 as the legitimate user based on the collation result 97 of the collation unit 89.

Therefore, unlike the authentication system described in JP2014-222445A, which displays the authentication code on the display unit of the mobile terminal, in the authentication system 2 of the present disclosure, even a user 11 who does not possess a mobile terminal or a user 11 who possesses a mobile terminal but is not familiar with the handling can receive the authentication. This makes it possible to achieve social inclusion, which has been recently advocated for (that is, embracing and supporting all individuals as members of the community so as to protect them from loneliness, isolation, exclusion, and conflicts and to lead to achieving a healthy and cultural lifestyle). In addition, authentication can be performed even in a situation where the mobile terminal cannot be used. Therefore, it can be said that the authentication system 2 of the present disclosure is more convenient than the authentication system described in JP2014-222445A.

The card issuing unit 12 and the authentication unit 13 operate independently of each other. Therefore, unlike the conventional authentication system, there is no need for a server that is connected to the card issuing terminal 15 and the authentication terminal 24 via a network and that collectively manages the IDs of legitimate users. It is also possible to eliminate the effort of collating the IDs of all the legitimate users stored in the server with the ID of the user 11 who attempts to receive the authentication.

The card issuing unit 12 has a simple configuration of the printer-equipped digital camera 14 and the card issuing terminal 15. Therefore, there are no restrictions on the installation location, and the installation can be performed as long as there is a small amount of space. Accordingly, it is possible to install the card issuing units 12 at a plurality of locations and issue the ID cards 10 in a distributed manner at the plurality of locations.

In addition, the control unit 63 controls the operation of the printer-equipped digital camera 14 to cause the printer-equipped digital camera 14 to capture the first facial image 16 and print the authentication code 18 and the first facial image 16 on the instant film 17. Therefore, unlike the conventional authentication system, it does not take several days to issue the ID card 10, and the ID card 10 can be immediately issued and distributed to the user 11 at the installation location of the card issuing unit 12.

The ID card 10 is designed such that the authentication as the legitimate user cannot be received unless the user 11 himself/herself uses the ID card 10. Therefore, a plurality of ID cards 10 can be issued. In addition, in a case of losing the ID card 10, the conventional authentication system requires a complicated procedure, such as making the ID card 10 unusable, but in the case of the present example, such a procedure is not necessary. Simply reissuing the ID card 10 is sufficient. Even in a case in which the ID card 10 is forgotten, the ID card 10 need only be reissued on the spot.

The identification ID 51 indicating that the ID card 10 is issued by the card issuing task of the CPU 42A of the card issuing terminal 15 is added to the ID card 10. As shown in FIGS. 9 and 10, in a case in which the identification ID 51 is improper, the determination unit 90 determines that the user 11 is not the legitimate user regardless of the collation result 97. Therefore, it is possible to avoid erroneously determining, as the legitimate user, a user 11 who belongs to a facility other than the introduction facility of the authentication system 2, or a user 11 who attempts to receive authentication with the ID card 10 which is not issued by the card issuing task, such as a forged ID card 10.

The first facial image 16 is an image that satisfies a standard set in advance. Therefore, the first facial feature information 70 suitable for authentication can be extracted. In addition, the first facial image 16 as the display facial image is printed on the ID card 10. Therefore, the face of the user 11 himself/herself and the first facial image 16 can be compared on the spot, and the impersonation of the user 11 can be easily detected.

For a user 11 who has lost the qualification of the legitimate user, such as a retired person or an employee of a closed store, the ID card 10 is collected from the user 11 at the time of leaving work on the day when the qualification of the legitimate user is lost. The employee of the closed store may be excluded by making the identification ID 51 include the store ID and determining that the user 11 having the authentication code 18 registered as the store ID of the closed store is not the legitimate user.

Instead of or in addition to outputting the warning audio from the speaker 23, for example, a display unit may be provided at the upper part of the security door 22 to display a symbol or character indicating the determination result 98, such as "o" or "OK", "x" or "No Good (NG)".

Second Embodiment

In the above-described first embodiment, the identification ID 51 indicating that the ID card 10 is issued by the card issuing task is added to the ID card 10, but the present disclosure is not limited to this. As a method of ensuring that the ID card 10 is issued by the card issuing task, the second embodiment shown in FIG. 16 may be employed.

Figure 16:
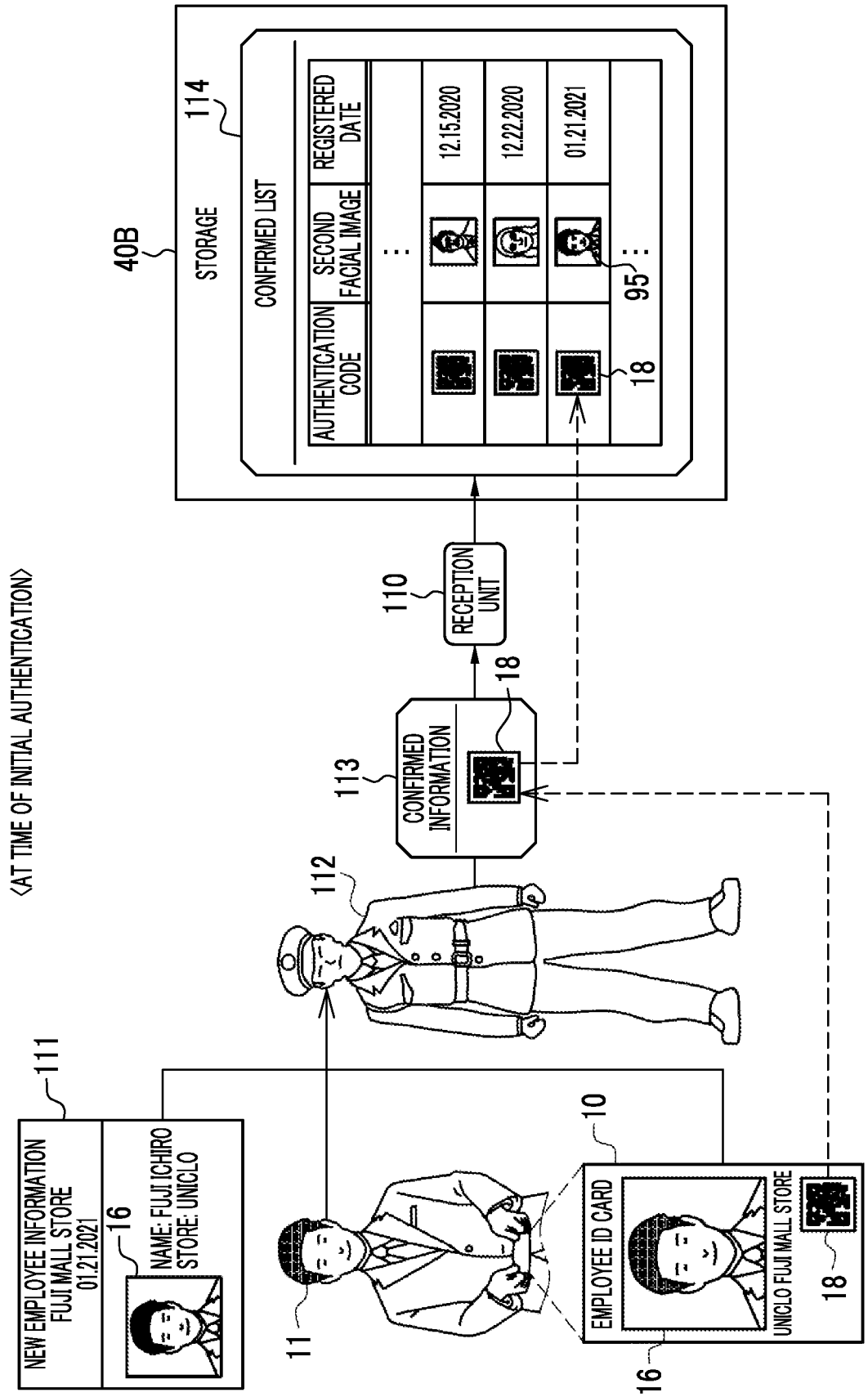
FIG. 16 is a diagram showing an outline of a second embodiment.

As shown in FIG. 16 as an example, in the second embodiment, a reception unit 110 is constructed in the CPU 42B of the authentication terminal 24 in addition to the processing units 85 to 91 of the first embodiment. Then, new employee information 111, which is the information of the new employee who will work in the introduction facility from now, is delivered in advance to a security guard 112 of the introduction facility. In the new employee information 111, the first facial image 16 and the name of the user 11, who is the new employee, and the store to which the user 11 belongs are described.

The security guard 112 stands in front of the authentication unit 13 and, in a case in which the user 11, who is the new employee attempting to receive authentication, comes to work for the first time, compares the new employee information 111, the face of the user 11, and the ID card 10 possessed by the user 11. Then, in some cases, the security guard 112 may ask the user 11 to present a driver's license or the like by which the name can be confirmed, and visually confirm that the user 11 is a person registered in the new employee information 111.

In a case in which it is determined by visual confirmation that the user 11 is a person registered in the new employee information 111, the security guard 112 inputs confirmed information 113 to the authentication terminal 24. The confirmed information 113 includes the authentication code 18 read by the code reader 20 from the ID card 10 possessed by the user 11 who is the new employee. On the other hand, in a case in which it is determined by visual confirmation that the user 11 is not a person registered in the new employee information 111, the security guard 112 takes appropriate measures such as prompting the user 11 to move out. The security guard 112 is an example of a "qualified person" according to the technology of the present disclosure. The confirmed information 113 is an example of "second identification information" according to the technology of the present disclosure.

The reception unit 110 receives the confirmed information 113. The reception unit 110 registers the confirmed information 113 in a confirmed list 114 of the storage 40B. In the confirmed list 114, the authentication code 18 included in the confirmed information 113, the second facial image 95 captured by the authentication camera 21, and the registration date are registered. The second facial image 95 need not be registered.

In a case of performing the authentication after the initial authentication, the determination unit 90 searches whether or not the authentication code 18 acquired by the first acquisition unit 85 is registered in the confirmed list 114. Then, in a case in which the authentication code 18 acquired by the first acquisition unit 85 is registered in the confirmed list 114, it is determined that the ID card 10 is issued by the card issuing task, similarly to the case of the identification ID 51 of the first embodiment.

A case in which the authentication code 18 acquired by the first acquisition unit 85 is not registered in the confirmed list 114 is, that is, at the time of initial authentication. In this case, the security guard 112 performs visual confirmation as described above.

As described above, in the second embodiment, the reception unit 110 receives input of the confirmed information 113 indicating that the security guard 112 has confirmed that the ID card 10 is issued by the card issuing task for the user 11 who attempts to receive the authentication for the first time. Therefore, similarly to the case of the identification ID 51 of the above-described first embodiment, it is possible to avoid erroneously determining, as the legitimate user, the user 11 who attempts to receive the authentication with the ID card 10 that is not issued by the card issuing task.

The qualified person is not limited to the security guard 112. The qualified person may be the superior of the store to which the user 11, who is the new employee, belongs. In addition, the number of qualified persons is not limited to one. A double check may be performed by the security guard 112 and the superior.

Third Embodiment

Figure 17:
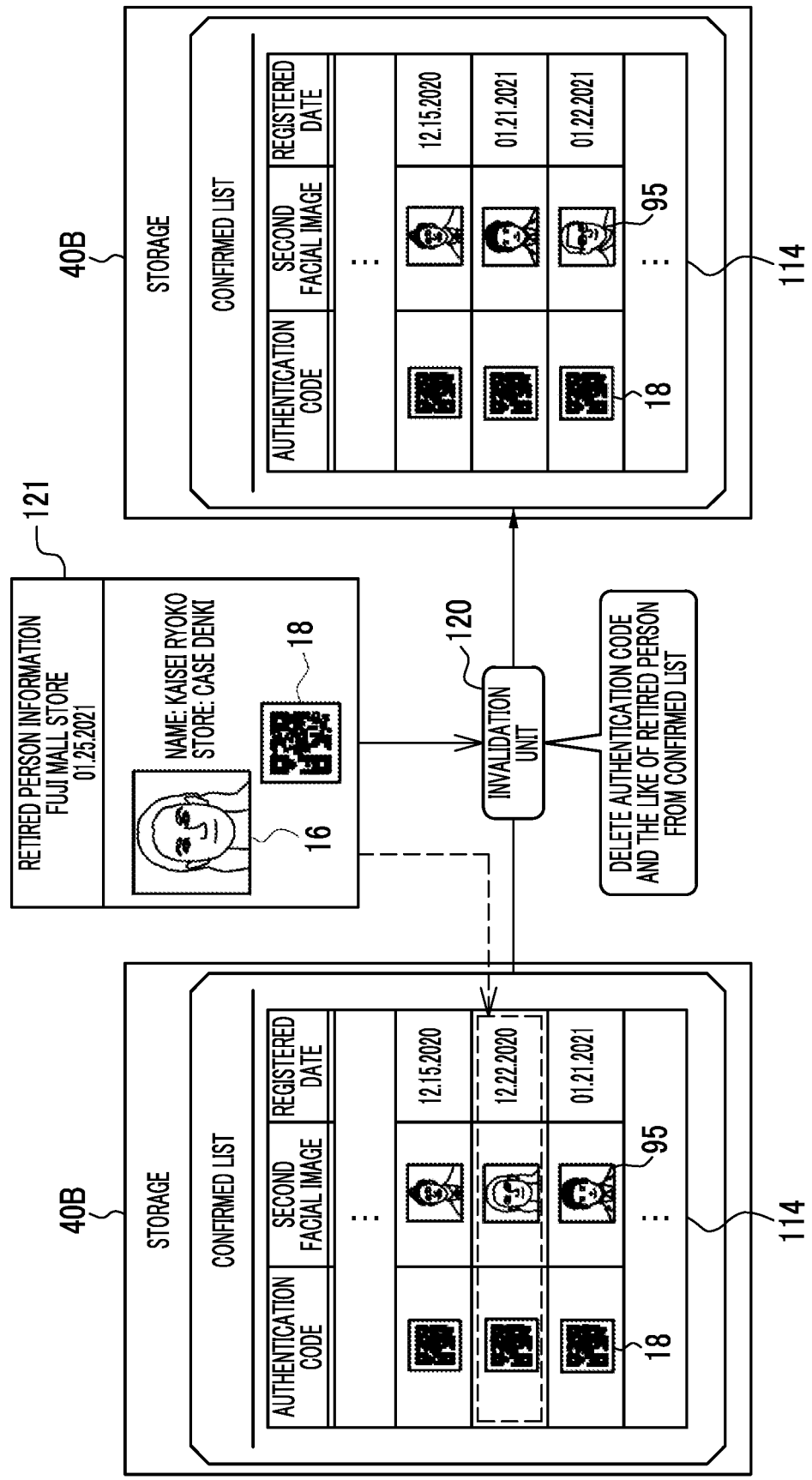
FIG. 17 is a diagram showing an outline of a third embodiment.

For the user 11 who has lost the qualification of the legitimate user, such as a retired person or an employee of a closed store, instead of or in addition to collecting the ID card 10, a method of the third embodiment shown in FIG. 17 may be applied.

As shown in FIG. 17 as an example, in the third embodiment, an invalidation unit 120 is constructed in the CPU 42B of the authentication terminal 24, in addition to the processing units 85 to 91 of the first embodiment and the reception unit 110 of the second embodiment. The invalidation unit 120 receives, for example, retired person information 121 to be input to the authentication terminal 24 by the security guard 112. In the retired person information 121, the first facial image 16, the authentication code 18, and the name of the user 11, who is the retired person, and the store to which the user 11 belongs are described. At least the authentication code 18 need only be described in the retired person information 121.

The invalidation unit 120 searches for the authentication code 18 described in the retired person information 121 from the confirmed list 114 of the storage 40B, which is created based on the confirmed information 113. Then, the authentication code 18 that has been searched for is invalidated by being deleted from the confirmed list 114 together with the second facial image 95 and the registration date. The storage 40B is an example of a "storage unit" according to the technology of the present disclosure. In addition, the confirmed information 113 is an example of "third identification information" according to the technology of the present disclosure.

As described above, in the third embodiment, the confirmed information 113 indicating that the ID card 10 is issued by the card issuing task is stored in the storage 40B. Then, the invalidation unit 120 invalidates the confirmed information 113 for the user 11 who has lost the qualification of the legitimate user. Therefore, it is possible to avoid erroneously determining the user 11 who has lost the qualification of the legitimate user as the legitimate user.

As a method of invalidating the confirmed information 113, the following method may be employed. That is, in addition to the confirmed list 114, a list of users 11 who have lost the qualifications of legitimate users (hereinafter, referred to as a disqualified person list) is prepared in the storage 40B. The invalidation unit 120 shifts the authentication code 18 and the like from the confirmed list 114 to the disqualified person list for the user 11 who has lost the qualification of the legitimate user. By doing this, the authentication code 18 and the like of the user 11 who has lost the qualification of the legitimate user can be left in the storage 40B. For example, in a case in which the closed store resumes operations, the authentication code 18 can be restored from the disqualified person list to the confirmed list 114 for the employee of the store.

Instead of or in addition to the retired person information 121, the invalidation unit 120 may receive the information on the employee of the closed store to invalidate the confirmed information 113 of the employee of the closed store.

The confirmed list 114 may be created by connecting the card issuing terminal 15 and the authentication terminal 24 and transmitting the authentication code 18 from the card issuing terminal 15 to the authentication terminal 24. By doing this, the qualified person, such as the security guard 112, does not need to perform confirmation at the time of initial authentication.

Figure 18:
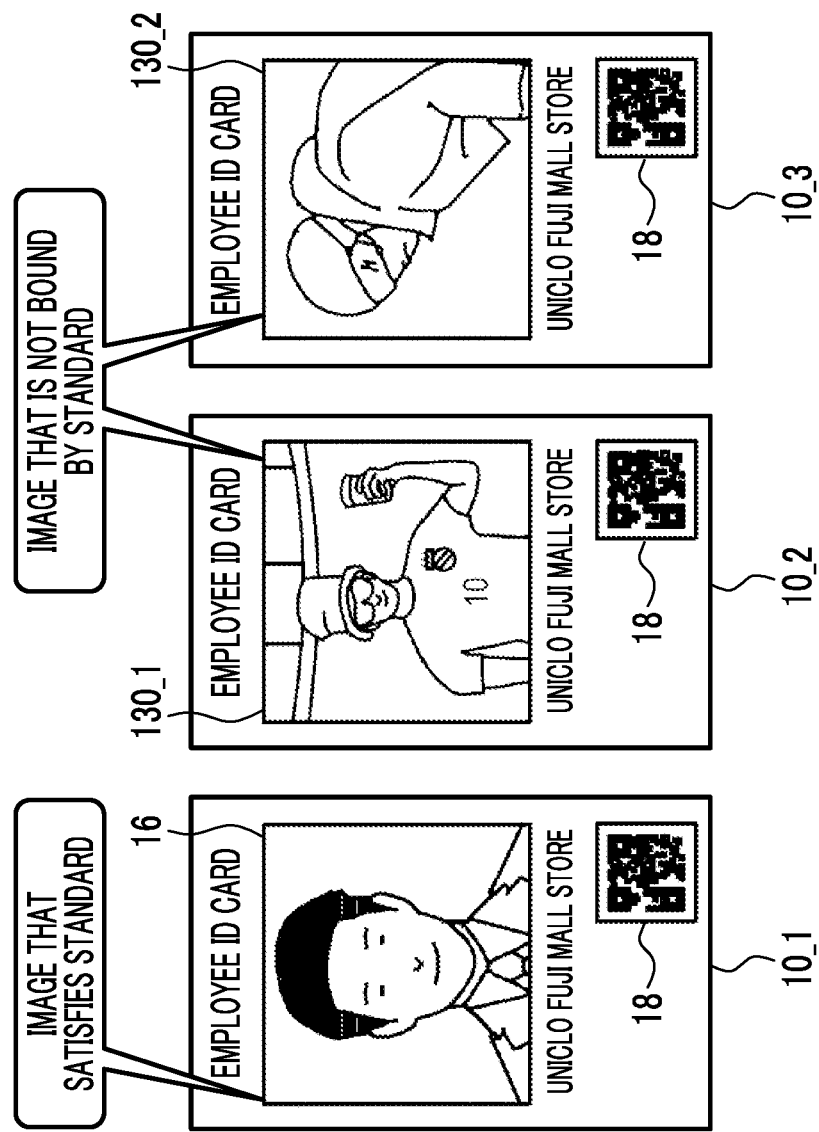
FIG. 18 is a diagram showing a plurality of ID cards having different display facial images.

In each of the above-described embodiments, as the display facial image, the first facial image 16 that satisfies a standard set in advance has been described as an example, but the present disclosure is not limited to this. As shown in FIG. 18 as an example, in addition to an ID card 10_1 that uses the first facial image 16 as the display facial image, an ID card 10_2 that uses a facial image 130_1 which is not bound by the standard as the display facial image, and an ID card 10_3 that uses a facial image 130_2 which is not bound by the standard as the display facial image may be issued. The facial image 130_1 is an image captured when the user 11 watches a soccer game. The facial image 130_2 is an image captured when the user 11 snowboards. Both the facial images 130_1 and 130_2 are images provided by the user 11 to the card issuing terminal 15.

The display facial image is only for visual confirmation of the face of the user 11, and the authentication of the user 11 is performed by the authentication code 18. Therefore, there is no problem in the authentication itself even in a case in which the facial image 130 that is not bound by the standard is used as the display facial image.

As described above, the display facial image to be printed on the ID card 10 may be the facial image 130 that is not bound by the standard. Therefore, the facial image 130 according to the preference of the user 11 can be used as the display facial image. In addition, the variation of the ID card 10 can be increased.

The facial image 130 that is not bound by the standard may be, for example, a facial image decorated with a commercially available image processing application program. Both the first facial image 16 and the facial image 130 that is not bound by the standard may be printed on one ID card 10.

Figure 19:
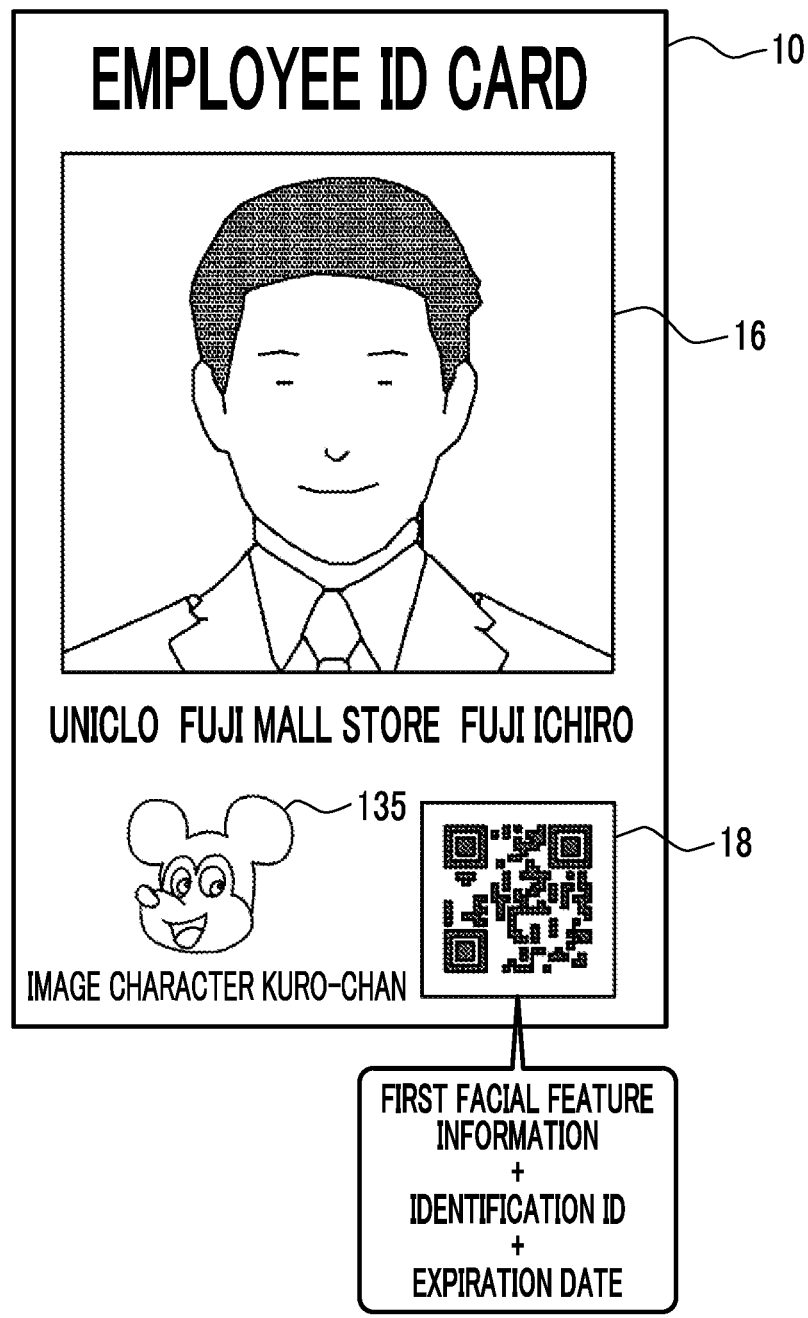
FIG. 19 is a diagram showing another example of the ID card.

As in the ID card 10 shown in FIG. 19 as an example, in addition to the first facial image 16, the authentication code 18, and the like, an illustration 135, such as an image character of the introduction facility, may be printed. In addition, the authentication code 18 may include an expiration date of the ID card 10 in addition to the first facial feature information 70 and the identification ID 51.

As the illustration 135, instead of or in addition to the image character of the introduction facility described as an example, a character of an animation or game affiliated with the campaign, a logo of a sponsored sports competition, a logo of the introduction facility and/or the store, or the like may be used. Further, the present disclosure is not limited to the illustration 135, and characters indicating an event or campaign being held at the introduction facility or the store may be printed on the ID card 10. Furthermore, a pattern, such as a waffle pattern, a hound's tooth, or a checkered pattern may be printed on the ID card 10.

The authentication code 18 may include information that limits the usage location of the ID card 10, for example, permitting the use of only one of two entrances/exits for commuting. In addition, for the purpose of performing maintenance on the printer-equipped digital camera 14, the authentication code 18 may include the cumulative number of prints of the printer-equipped digital camera 14, in which the ID cards 10 have been printed. In this case, in a case in which the cumulative number of prints approaches the useful number of the printer-equipped digital camera 14, the administrator of the authentication system 2 is notified to urge the replacement of the printer-equipped digital camera 14.

The expiration date of the ID card 10 may be a short period, such as one day or one week, for example. By doing this, it is possible to eliminate the effort of collecting the ID card 10 from the user 11 who has lost the qualification of the legitimate user.

In each of the above-described embodiments, an example in which the printer-equipped digital camera 14 is used has been described, but the present disclosure is not limited to this. A printer that prints the ID card 10 and a digital camera that captures the first facial image 16 may be separately prepared. Therefore, the card medium is not limited to the instant film 17 described as an example. A plastic plate or the like may be used.

The authentication code 18 is not limited to the QR code described as an example. A barcode may be used.

The information of the issued ID card 10, such as the first facial image 16, the authentication code 18, the name of the user 11, the store to which the user 11 belongs, the illustration 135, characters, and a pattern, may be stored in a database connected to the card issuing terminal 15. In addition, the history of the collation result 97 and the determination result 98 may be stored in a database connected to the authentication terminal 24 together with the authentication code 18, the second facial image 95, and the like.

A film ID for uniquely identifying each of the instant films 17 may be attached to the instant film 17, and this film ID may be used for the authentication task.

In each of the above-described embodiments, as the hardware structure of a processing unit that executes various types of processing, such as the acquisition unit 60, the extraction units 61 and 88, the generation unit 62, the control units 63 and 91, the first acquisition unit 85, the decoding unit 86, the second acquisition unit 87, the collation unit 89, the determination unit 90, the reception unit 110, and the invalidation unit 120, various processors described below can be used. The various processors include, as described above, in addition to the CPUs 42A and 42B which are general-purpose processors that execute software (operation programs 50A and 50B) to function as various processing units, a programmable logic device (PLD) which is a processor having a changeable circuit configuration after manufacture, such as a field programmable gate array (FPGA), a dedicated electric circuit which is a processor having a dedicated circuit configuration designed to execute specific processing, such as an application specific integrated circuit (ASIC), and the like.

One processing unit may be composed of one of these various processors or a combination of two or more processors of the same type or different types (for example, a combination of a plurality of FPGAs and/or a combination of a CPU and an FPGA). Alternatively, a plurality of processing units may be composed of one processor.

A first example in which the plurality of processing units are composed of one processor is an aspect in which one or more CPUs and software are combined to constitute one processor and the processor functions as a plurality of processing units, as typified by a computer such as a client and a server. A second example is an aspect in which a processor that realizes the functions of the entire system including a plurality of processing units with one integrated circuit (IC) chip is used, as typified by system on chip (SoC) and the like. As described above, various processing units are composed of one or more of the above-described various processors as the hardware structure.

Furthermore, as the hardware structures of these various processors, more specifically, an electric circuitry in which circuit elements, such as semiconductor elements, are combined can be used.

The technology of the present disclosure can also appropriately combine the above-described various embodiments and/or various modification examples. Further, it goes without saying that the technology of the present disclosure is not limited to each of the above-described embodiments and various configurations may be employed without departing from the gist. Furthermore, the technology of the present disclosure extends to a storage medium that stores the program in a non-transitory manner, in addition to the program.

The contents described and shown above are detailed descriptions of the parts related to the technology of the present disclosure and are merely an example of the technology of the present disclosure. For example, the descriptions of the above-described configurations, functions, operations, and effects are the descriptions of an example of the configurations, functions, operations, and effects of the parts related to the technology of the present disclosure. Accordingly, it is needless to say that unnecessary parts may be deleted, new elements may be added, or replacements may be made with respect to the contents described and shown above, within a scope that does not depart from the gist of the technology of the present disclosure. Further, in order to avoid complications and facilitate understanding of the parts related to the technology of the present disclosure, descriptions of common general knowledge and the like that do not require special descriptions for enabling the implementation of the technology of the present disclosure are omitted, in the contents described and shown above.

In the present specification, "A and/or B" has the same meaning as "at least one of A or B". That is, "A and/or B" means that only A may be used, only B may be used, or a combination of A and B may be used. In addition, in the present specification, the same concept as "A and/or B" is also applied to a case in which three or more matters are expressed by "and/or".

All documents, patent applications, and technical standards described in the present specification are incorporated in the present specification by reference to the same extent as in a case in which the individual documents, patent applications, and technical standards were specifically and individually stated to be incorporated by reference.

What is claimed is:

1. An authentication system comprising:
   a processor; and
   a memory connected to or incorporated in the processor, the processor having:
      a first processor configured to perform a card issuing task of issuing an ID card of a user; and
      a second processor configured to perform an authentication task of using the ID card to determine whether or not to authenticate the user as a legitimate user,
   wherein the first processor is configured to, as the card issuing task:
      acquire a first facial image of the user;
      extract first facial feature information from the first facial image;
      generate an authentication code representing the first facial feature information; and
      cause a printer to print the authentication code and a display facial image of the user on a card medium to create the ID card, and
   the second processor is configured to, as the authentication task:
      acquire the authentication code printed on the ID card possessed by the user and a second facial image of the user;
      decode an identification number and the first facial feature information from the authentication code;
      extract second facial feature information from the second facial image using the same algorithm as used in a case of extracting the first facial feature information from the first facial image;
      collate the first facial feature information with the second facial feature information; and
      perform the determination based on a collation result, the identification number, and an identification number stored in a storage controlled by the second processor.

2. The authentication system according to claim 1, wherein first identification information indicating that the ID card is issued by the card issuing task is added to the ID card, and
   the second processor is configured to,
      in a case in which the first identification information is improper, determine that the user is not the legitimate user regardless of the collation result.

3. The authentication system according to claim 1, wherein the second processor is configured to
      receive input of second identification information indicating that a qualified person has confirmed that the ID card is issued by the card issuing task for the user who attempts to receive authentication for a first time.

4. The authentication system according to claim 1, wherein the second processor is configured to:
   invalidate the identification information for the user who has lost a qualification of the legitimate user.

5. The authentication system according to claim 1, wherein the first facial image is an image that satisfies a standard set in advance.

6. The authentication system according to claim 5, wherein the display facial image is the first facial image.

7. The authentication system according to claim 5, wherein the display facial image is an image that is not bound by the standard.

8. The authentication system according to claim 1, wherein the first processor is configured to
control an operation of a printer-equipped digital camera to cause the printer-equipped digital camera to capture the first facial image and print the authentication code and the display facial image on the card medium.

9. An operation method of an authentication system, the operation method being for performing a card issuing task of issuing an ID card of a user and an authentication task of using the ID card to determine whether or not to authenticate the user as a legitimate user, the operation method comprising:
as the card issuing task,
acquiring a first facial image of the user;
extracting first facial feature information from the first facial image;
generating an authentication code representing the first facial feature information; and
causing a printer to print the authentication code and a display facial image of the user on a card medium to create the ID card, and
as the authentication task,
acquiring the authentication code printed on the ID card possessed by the user and a second facial image of the user;
decoding an identification number and the first facial feature information from the authentication code;
extracting second facial feature information from the second facial image using the same algorithm as used in a case of extracting the first facial feature information from the first facial image;
collating the first facial feature information with the second facial feature information; and
performing the determination based on a collation result, the identification number, and an identification number stored in a storage controlled by a second processor.

10. A non-transitory computer-readable storage medium storing an operation program of an authentication system, the operation program being for performing a card issuing task of issuing an ID card of a user and an authentication task of using the ID card to determine whether or not to authenticate the user as a legitimate user, the operation program causing a computer to execute a process comprising:
as the card issuing task,
acquiring a first facial image of the user;
extracting first facial feature information from the first facial image;
generating an authentication code representing the first facial feature information; and
causing a printer to print the authentication code and a display facial image of the user on a card medium to create the ID card, and
as the authentication task,
acquiring the authentication code printed on the ID card possessed by the user and a second facial image of the user;
decoding an identification number and the first facial feature information from the authentication code;
extracting second facial feature information from the second facial image using the same algorithm as used in a case of extracting the first facial feature information from the first facial image;
collating the first facial feature information with the second facial feature information; and
performing the determination based on a collation result, the identification number, and an identification number stored in a storage controlled by a second processor.

11. The authentication system of claim 1, wherein the processor is further configured to transmit an unlock instruction signal in response to the user having been authenticated based on the determination.

* * * * *